(12) United States Patent
Ozone et al.

(10) Patent No.: US 7,941,794 B2
(45) Date of Patent: May 10, 2011

(54) DATA FLOW GRAPH PROCESSING METHOD AND PROCESSING APPARATUS PROVIDED WITH RECONFIGURABLE CIRCUIT

(75) Inventors: Makoto Ozone, Hirakata (JP); Hiroshi Nakajima, Kyoto (JP); Tatsuo Hiramatsu, Daito (JP); Katsunori Hirase, Neyagawa (JP); Makoto Okada, Daito (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1345 days.

(21) Appl. No.: 11/212,598

(22) Filed: Aug. 29, 2005

(65) Prior Publication Data

US 2006/0048113 A1    Mar. 2, 2006

(30) Foreign Application Priority Data

Aug. 30, 2004  (JP) ................. 2004-250666
Aug. 30, 2004  (JP) ................. 2004-250671
Mar. 22, 2005  (JP) ................. 2005-081919

(51) Int. Cl.
*G06F 9/45* (2006.01)
*G06F 15/00* (2006.01)

(52) U.S. Cl. ........ 717/156; 717/155; 717/151; 717/154; 717/157; 712/201

(58) Field of Classification Search .......... 717/155–158, 717/141–144, 124, 131–133; 716/2, 16–18; 326/37–50; 712/201

See application file for complete search history.

(56) References Cited

U.S. PATENT DOCUMENTS

| 4,918,587 | A  | * | 4/1990 | Pechter et al. ................. 711/218 |
| 5,742,180 | A  | * | 4/1998 | DeHon et al. ................... 326/40 |
| 2004/0088666 | A1 | * | 5/2004 | Poznanovic et al. .............. 716/7 |
| 2004/0088685 | A1 | * | 5/2004 | Poznanovic et al. .......... 717/140 |
| 2005/0283768 | A1 | * | 12/2005 | Ozone .......................... 717/144 |
| 2006/0036413 | A1 | * | 2/2006 | Campbell et al. ................. 703/2 |
| 2007/0198971 | A1 | * | 8/2007 | Dasu et al. .................... 717/140 |

FOREIGN PATENT DOCUMENTS

| JP | 11-232079 A | 8/1999 |
| JP | 2001-68993 A | 3/2001 |
| JP | 2003-29969 A | 1/2003 |
| JP | 2004-220377 | 8/2004 |
| WO | WO 03/023602 A1 | 3/2003 |

OTHER PUBLICATIONS

Author: Goldstein et al.; Title: "PipeRench: A Reconfigurable Architecture and Compiler"; Date: 2000; URL: http://citeseerx.ist.psu.edu/viewdoc/summary?doi=10.1.1.41.5760.*

(Continued)

*Primary Examiner* — Insun Kang
(74) *Attorney, Agent, or Firm* — Westerman, Hattori, Daniels & Adrian, LLP

(57) ABSTRACT

A data flow graph processing method divides a program describing target operations into two or more subprograms and converts each of the two or more subprograms into a data flow graph (DFG) representing dependency in execution between operations carried out in sequence. Also generated is flow data indicating the order of execution of DFGs corresponding to respective subprograms. DFGs are converted into configuration data and the flow data is converted into control data.

1 Claim, 27 Drawing Sheets

OTHER PUBLICATIONS

Author: Zhenquiang et al.; Title: "Test Coverage Analysis Based on Program Slicing"; Date: May 2003; URL: http://www.springerlink.com/content/w376749062015576/.*

Author: Zhang et al.; Title: "A review of high-level synthesis for dynamically reconfigurable FPGAs"; Date: Jan. 2002; URL: http://www.sciencedirect.com/science/article/B6V0X-40R5BXC-3/2/0b21211a803f8224113f3a2488612c68.*

Author: Vissers; Title: "Parallel processing architectures for reconfigurable systems"; Date: Mar. 7, 2003; URL: http://www2.computer.org/portal/web/csdl/abs/proceedings/date/2003/1870/01/187010396abs.htm.*

Author: Blodget et al.; Title: "A Self-reconfiguring Platform"; Date: Sep. 3, 2003; URL: http://www.springerlink.com/content/ack3yyv1xI59pt09/.*

Author: Antola et al.; Title: "On-line Diagnosis and Reconfiguration of FPGA Systems"; Date: Jan. 2002; URL: http://ieeexplore.ieee.org/search/wrapper.jsp?arnumber=994633.*

Author: Mohan et al.; Title: "Temporal Partitioning of Circuits for Advanced Partially Reconfigurable Systems"; Date: 2001; URL: http://spiedl.aip.org/getabs/servlet/GetabsServlet?prog=normal&id=PSISDG004525000001000027000001&idtype=cvips&gifs=Yes.*

Author: Bazargan et al.; Title: "3-D Floorplanning: Simulated Annealing and Greedy Placement Methods for Reconfigurable Computing Systems"; Date: Aug. 2000; URL: http://www.springerlink.com/content/ug47q652t6h0616t/?p=361cf179ecac4b89aa217222c049fa6c&pi=2.*

Author: Andersson et al.; Title: "Performance oriented partitioning for time-multiplexed FPGA's"; Date: Sep. 2000; URL: http://ieeexplore.ieee.org/search/wrapper.jsp?arnumber=874616.*

Author: Compton et al.; Title: "Reconfigurable Computing: A Survey of Systems and Software"; Date: 2000; URL: http://citeseerx.ist.psu.edu/viewdoc/summary?doi=10.1.1.25.4130.*

Japanese Office Action dated Dec. 2, 2008 (mailing date), issued in corresponding Japanese Patent Application No. 2004-250671.

Decision of Refusal dated Aug. 18, 2009 in corresponding Japanese Patent Application No. 2004-250671.

* cited by examiner

```
void func1(int *x,int *y);
void func0(int x,int *y)
{
    int i;

x+=1;
    func1(&x,y);

*y+=2;
    for(i =0 ; i<100; i++) {
        *y+=x;
    }
}
```

```
void func1(int *x, int *y);
{
    if (*y>0) {
        *x=*x>>2;
        *y-=*x+3;
    }
}
```

FIG.6

```
void func0(int x,int *y)
{
    int i;

x+=1;
    if (*y>0) {
        x=x>>2;
        *y-=x+3;
    }

*y+=2;
    for (i=0 ; i<100; i++) {
        *y+=x;
    }
}
```

FIG.8

```
int _SEQ_;

void func0(int x,int *y)
{
    int i;

x+=1;
    _SEQ_=*y>0;
    if (_SEQ_) {
        x=x>>2;
        *y-=x+3;
    }

*y+=2;
    i=0;
    do {
        *y+=x;
        i++;
        _SEQ_=i<100;
    }while(_SEQ_);
}
```

FIG.10 func01
```
x+= 1;
_SEQ_=*y>0;
``` func02
```
x=x>> 2;
*y-=x+3;
``` func03
```
*y+=2;
i=0;
``` func04
```
*y+=x;
i++;
_SEQ_=i<100;
```

```
func0
func01
if(_SEQ_){
        func02
} func03
do{
        func04
}while(_SEQ_);
```

```
....
do{
    <A>
    do{
        <B>
    }while(_SEQ_);
    <C>
}while(_SEQ_);
....
```

FIG.20

```
void func1/*_SEQ_*/(int *a, int *b);

void func0(int x[10], int z[10], int *y)
{
    int i;
    int m;

m=x[0]+1;
    func1/*_SEQ_*/(x,&m);

*y+=m;

func1/*_SEQ_*/(z,y);

for(i=0 ; i<2 ; i++){
        *y+=x[i];
    }
    for/*_SEQ_*/(i=0 ; i<2 ; i++){
        *y+=x[i];
    }
}
```

```
void func1/*_SEQ_*/(int a[10], int *b)
{
    if(*b>0) {
        a[b]=a[b]>>2;
        *b-=a[b]+3;
    }
}
```

FIG.21

```
int_SEQ_;

void func0(int x[10], int z[10], int *y)
{
    int i;
    int m;
    int a[10];
    int b;

m=x[0]+1;

a=x;
    b=m;
    func1/*_SEQ_*/(a,&b);
    m=b;

*y+=m;

a=z;
    b=*y;
    func1/*_SEQ_*/(a,&b);
    *y=b;

*y+=x[0];
    *y+=x[1];

i=0;
    do{
        *y+=x;
        i++;
        _SEQ_=i<2;
    }while(_SEQ_);

}
```

```
void func1/*_SEQ_*/(int a[10], int *b)
{
    if(*b >0) {
        a[b]=a[b]>>2;
        *b-=a[b]+3;
    }
}
```

```
void func0(int x,int y,int *z
{
    int i;

x+=1;
    if(y > 0){
        x=x>>2;
        y-=3;
        *z+=4;
    }
    else{
        x=5;
    }

*z+=y;
    for(i=0 ; i<100; i++){
        *z+=x;
    }
}
```

```
int _SEQ_;

void func0(int x, int y, int *z)
{
    int i;

x +=1;
    if(y > 0){
        x = x >> 2;
        y -= 3;
        *z += 4;
    }
    else{
        x = 5;
    }

*z += y;
    i = 0;
    do{
        *z += x;
        i++;
        _SEQ_ = i < 100;
    }while(_SEQ_);
}
```

```
func0
    func01
    do{
        func02
    }while(_SEQ_);
```

FIG.36

```
if(flag_empty == 1)
        COMaddr2 = EMPTYDFG_ADDR;
else
        COMaddr2 = COMaddr1 + counter - 1;
```

FIG.37

```
if(counter == pos_c + DELAYTIME1)
        flag_c = 1;
else
        flag_c = 0;
if(counter == step + empty - DELAYTIME2)
        change_addr = 1;
else
        change_addr = 0;
if(counter > step)
        flag_empty = 1;
else
        flag_empty = 0;
if(counter == step + empty)
        counter = 1;
else
        counter ++;
```

FIG.38

```
if(flag_c == 1) {
        if(c == 0)
                set_c = b;
        else
                set_c = a;
}
if(change_addr == 1) {
        if(pos_c == 0)
                addr += a;
        else
                addr += set_c;
}
else
        addr = addr;
```

DATA FLOW GRAPH PROCESSING METHOD AND PROCESSING APPARATUS PROVIDED WITH RECONFIGURABLE CIRCUIT

BACKGROUND OF THE INVENTION

1. Field of the Invention

The present invention relates to a data flow graph processing method for processing a data flow graph necessary to configure the operation of a reconfigurable circuit with modifiable functions and a processing apparatus provided with a reconfigurable circuit with modifiable functions.

2. Description of the Related Art

Recently, efforts have been made toward the development of are configurable processor using a multifunctional element called arithmetic logic unit which is provided with a plurality of basic operating functions (see, for example, patent document No. 1). In a reconfigurable processor, command data are sequentially set in an ALU so that a target circuit for processing an operation is achieved through the entire sequence.

Command data is generated as data for mapping a data flow graph (DFG) into an ALU circuit, the DFG being a data flow generated from a source program described in a high-level language such as C. Command data is generated according to the order of processing in the circuit formed on the ALU circuit and is stored at consecutive addresses in a storage area.

Related Art List

JP 2004-220377 A

In the related-art reconfigurable processor, command data is sequentially read from a memory and supplied to an ALU circuit to configure the function of the ALU circuit. Therefore, if condition-handling such as an if statement is located in a source program, it is necessary to set command data for executing a plurality of branching processes on an ALU circuit so as to execute the associated operations beforehand. After the making a conditional determination, the operation result corresponding to the determination needs to be selected.

In this case, only the operation result in one of the branches is actually used and the other operation result is not used. This has resulted in causing processing time for operation to be extended beyond what is necessary.

When a loop operation such as a for statement with a predetermined loop count is located in a source program, the related-art reconfigurable circuit has to store, at consecutive addresses in a memory, a command data group for the same loop operation a predetermined number of times, the number of times of storage being equal to the loop count in the same loop operation.

For example, when the loop count is 10, the same command data group should be stored 10 times in a memory, thereby increasing the volume of command data. When the loop count is indefinite, the number of repetition is unknown so that it is difficult to generate command data itself.

The present invention has been made in view of the aforementioned points and relates to a data flow graph processing method capable of efficiently processing a data flow graph necessary to configure the operation of a reconfigurable circuit. The present invention also relates to a processing apparatus provided with a circuit reconfiguration function capable of executing operations efficiently.

SUMMARY OF THE INVENTION

In one embodiment of the present invention, there is provided a data flow graph processing method necessary for configuration of operation in a reconfigurable circuit with modifiable functions. The data flow graph processing method comprises the steps of: dividing a program describing target operations into two or more subprograms; and converting each of the two or more subprograms into a data flow graph representing dependency in execution between operations carried out in sequence. The step of dividing divides the program in accordance with a description in the program. The step of dividing may detect a branching process included in the program and extract each of processes at branch targets as a subprogram.

According to the data flow graph processing method, the number of data flow graphs necessary for execution of a loop statement is reduced by dividing a program into a plurality of subprograms. Accordingly, the volume of configuration data generated by conversion from the data flow graph is reduced and the memory capacity for storing the configuration data is reduced. Associated with the reduction in the volume of configuration data, the circuit scale of the reconfigurable circuit is reduced and processing time required to execute a branch statement is reduced.

In another embodiment of the present invention, there is provided a data flow graph processing method necessary for configuration of operation in a reconfigurable circuit with modifiable functions. The data flow graph processing method comprises the step of converting a program describing target operations into two or more data flow graphs in accordance with a conditional branch included in the program.

According to the data flow graph processing method, when the configuration data of the data flow graph is mapped into the reconfigurable circuit, the data flow graph at a branch target is selected depending on the result of determination at a conditional branch, by generating data flow graphs at each conditional branch. Accordingly, processing time is reduced, processing performance is improved and power consumption is reduced.

In another embodiment of the present invention, there is provided a data flow graph processing method for processing a data flow graph necessary for configuration of operation in a reconfigurable circuit with modifiable functions, comprising the steps of: dividing a program describing target operations into two or more subprograms; and generating flow data indicating the order of execution of data flow graphs representing dependency in execution between operations carried out in sequence.

According to the data flow graph processing method, the configuration data corresponding to the data flow graph is efficiently mapped into the reconfigurable circuit by determining the order of execution of the data flow graphs corresponding to the plurality of subprograms.

The reconfigurable circuit may be provided with an arithmetic logic unit capable of selectively executing any of a plurality of types of multi-bit operations.

In another embodiment, there is provided a data flow graph processing method for processing a data flow graph necessary for configuration of operation in a reconfigurable circuit with modifiable functions, wherein the reconfigurable circuit executes processes corresponding to the functions step by step, the data flow graph processing method comprising the steps of: converting a program for executing target operations into data flow graphs representing dependency in execution between operations carried out in sequence, by referring to a specific description in the program; and dividing the program into two or more subprograms in accordance with the number of execution steps in the reconfigurable circuit corresponding to the data flow graph.

The step of dividing may divide the program into two or more subprograms when the number of execution steps in the reconfigurable circuit corresponding to the data flow graph exceeds a reference number. The reference number may be set in accordance with the processing capability of the reconfigurable circuit.

The specific description may include a description indicating a condition for transition to one of a plurality of operations from a branch root.

The specific description may include a description indicating a condition for causing the same operation to be executed repeatedly.

In another embodiment of the present invention, there is provided a processing apparatus comprising: a reconfigurable circuit with modifiable functions; a configuration data holding unit which holds configuration data for forming a target circuit in the reconfigurable circuit and supplies the configuration data to the reconfigurable circuit; and a sequencer apparatus which selects the configuration data to be supplied from the configuration data holding unit to the reconfigurable circuit.

According to the processing apparatus, the sequencer apparatus can select the configuration data to be supplied to the reconfigurable circuit. With this, the sequencer apparatus is capable of selecting the next configuration data to be executed by referring to the result of determination at a conditional branch which is made in the operations to determine a branch target and processing time is reduced.

The present invention is applicable not only to the method but also to the apparatus, circuit, system and computer program.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 shows the programs of FIG. 5 lumped together by expanding a function;

FIG. 8 is a program in which an operation instruction for determination is added before the if statement in the program shown in FIG. 6;

FIG. 10 shows a plurality of subprograms ultimately generated by dividing the program shown in FIG. 8;

FIG. 20 shows an example of a source program;

FIG. 21 shows an example of a program with sequence process designation;

FIG. 36 shows an algorithm in the configuration data selecting unit for generating a read address;

FIG. 37 shows an algorithm for operation of a sequencer control unit; and

FIG. 38 shows an algorithm for operation of a sequencer control data selecting unit.

DETAILED DESCRIPTION OF THE INVENTION

Figure 1:
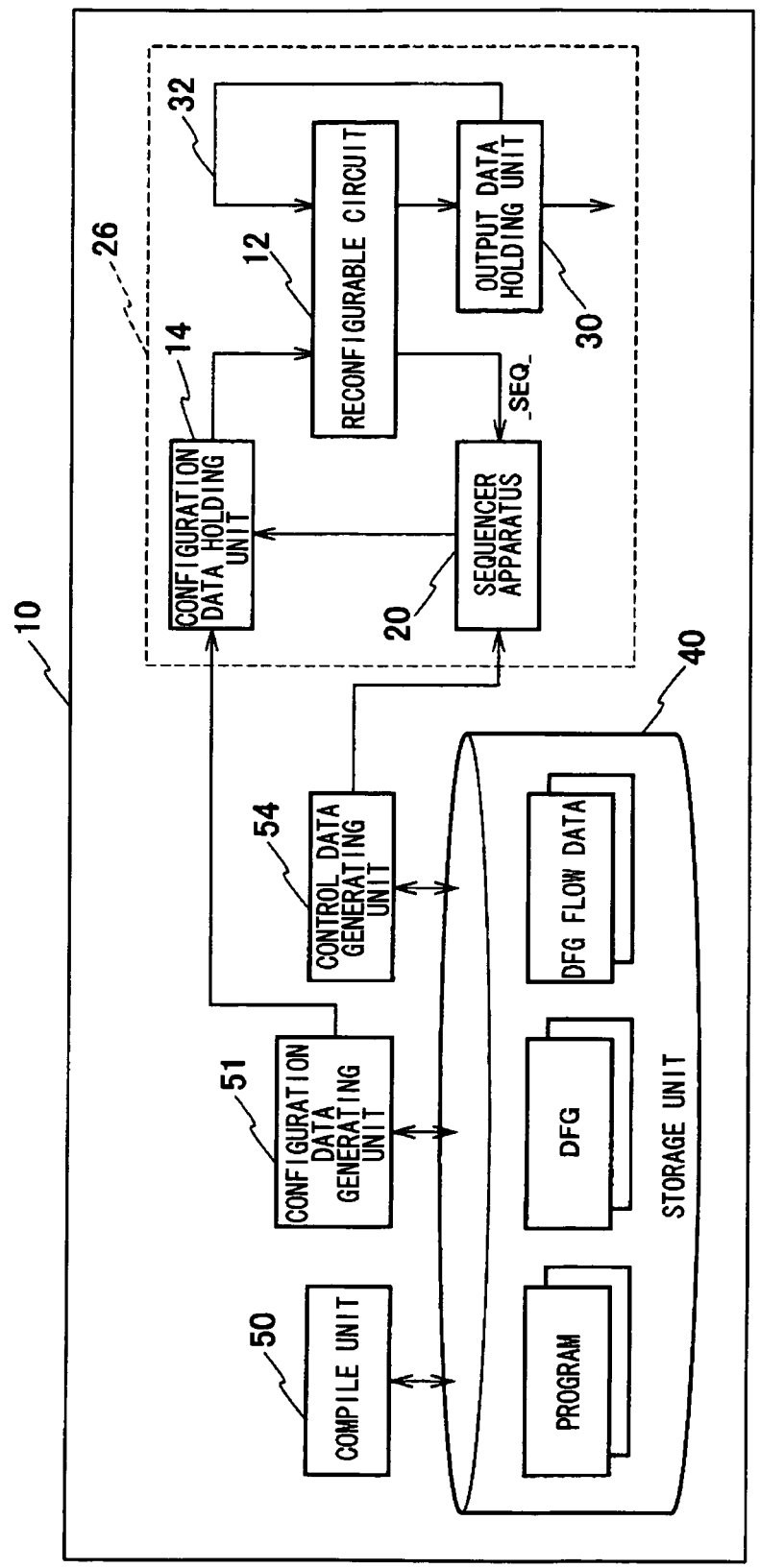
FIG. 1 shows the structure of a processing apparatus according to an example of the present invention.

FIG. 1 shows the structure of a processing apparatus 10 according to an illustrative example of the present invention. The processing apparatus 10 comprises an integrated circuit apparatus 26 with a reconfigurable circuit structure. The integrated circuit apparatus 26 is formed as a single chip and is provided with a reconfigurable circuit 12, a configuration data holding unit 14, a sequencer apparatus 20, an output data holding unit 30 and a route unit 32. The function of the reconfigurable circuit 12 is modifiable by changing the configuration thereof. The reconfigurable circuit 12 in the illustrative example of the invention executes processes corresponding to its function in execution steps (rows illustrated in FIG. 2 described later).

The configuration data holding unit 14 holds a plurality of sets of configuration data for forming a target circuit in the reconfigurable circuit 12. The configuration data holding unit 14 supplies configuration data to the reconfigurable circuit 12 at predetermined intervals. The configuration data holding unit 14 may be formed as a command memory that outputs the configuration data stored therein in accordance with a designated address. In this case, the configuration data may be referred to as command data. The sequencer apparatus 20 is provided with the function of selecting the configuration data to be supplied to the reconfigurable circuit 12 from the plurality of sets of configuration data stored in the configuration data holding unit 14.

The route unit 32 functions as a feedback path and connects the output of the reconfigurable circuit 12 to the input of the reconfigurable circuit 12. The output data holding unit 30 is provided with a storage area for storing a data signal output from the reconfigurable circuit 12 and/or a data signal input from an external source. The data signal stored in the output data holding unit 30 is transmitted to the input of the reconfigurable circuit 12 via the route unit 32 or delivered outside the processing apparatus 10 in accordance with an instruction from a control unit (not shown).

The reconfigurable circuit 12 is provided with a plurality of logic circuits with modifiable functions. More specifically, the reconfigurable circuit 12 is provided with a plurality of rows of logic circuits capable of selectively executing any of a plurality of operating functions. The reconfigurable circuit 12 is provided with connection units each capable of configuring the connectivity between outputs of logic circuits in a front row and inputs of logic circuits in a back-end row. The plurality of logic circuits may be organized in a matrix.

The function of each of the logic circuits and the connectivity between the logic circuits are configured in accordance with configuration data supplied from the configuration unit 14. The configuration data is supplied to the reconfigurable circuit 12 at predetermined intervals. This will enable the reconfigurable circuit 12 to execute target operations in accordance with the configuration data supplied.

The sequencer apparatus 20 manages the configuration data supplied by the configuration data holding unit 14 to the reconfigurable circuit 12 on the basis of an operation result in the reconfigurable circuit 12 or, more specifically, on the basis of the result of determination at a conditional branch. The sequencer apparatus 20 causes the configuration data holding unit 14 to output the target configuration data, based on control data generated from a program to be executed. The configuration data and the control data are generated according to the following procedure.

A program to be executed by the integrated circuit apparatus 26 is held in a storage unit 40. The program represents a description of target operations in the reconfigurable circuit 12 and, more specifically, a description of a signal processing circuit or a signal processing algorithm in a high-level language such as C.

A compile unit 50 reads the program stored in the storage unit 40. The compile unit 50 compiles the program thus read so as to generate a plurality of data flow graphs (DFG) and flow data indicating the order of processing the DFGs. The compile unit 50 stores the DFGs generated and the associated flow data in the storage unit 40.

A DFG is a representation of dependency in execution between operations carried out in sequence in the circuit and is a graph structure representation of the flow of operations involving input variables and constants. Generally, a DFG is generated such that operations proceed from top to bottom.

A plurality of DFGs are generated by dividing a program into a plurality of subprograms and subjecting each of the subprograms to conversion. DFG flow data defines the order of executing DFGs corresponding to a plurality of subprograms. Particularly, the data is generated so as to define the order of executing the DFG at the branch root and the DFG at the branch target when a conditional branch is created.

A configuration data generating unit 51 converts the DFG into the corresponding configuration data and stores the converted data in the configuration data holding unit 14. A control data generating unit 54 converts the DFG flow data into corresponding control data and stores the control data in the sequencer apparatus 20. The configuration data is for mapping the DFG into the reconfigurable circuit 12 and defines the function of logic circuits in the reconfigurable circuit 12 and the connectivity between the logic circuits.

The control data represents the connectivity between the configuration data (DFG) mapped into the reconfigurable circuit 12. During the execution of operations in the reconfigurable circuit 12, the control data determines a branch target DFG in accordance with branch control data _SFQ_, which is the result of determination at a conditional branch.

The sequencer apparatus 20 supplies a read address to the configuration data holding unit 14. In this process, the sequencer apparatus 20 determines the read address of the configuration data to be supplied to the reconfigurable circuit 12, in accordance with, for example, the value of branch control data _SEQ_ supplied from the reconfigurable circuit 12. Upon receipt of the read address, the configuration data holding unit 14 supplies the configuration data stored in the designated address to the reconfigurable circuit 12.

Figure 2:
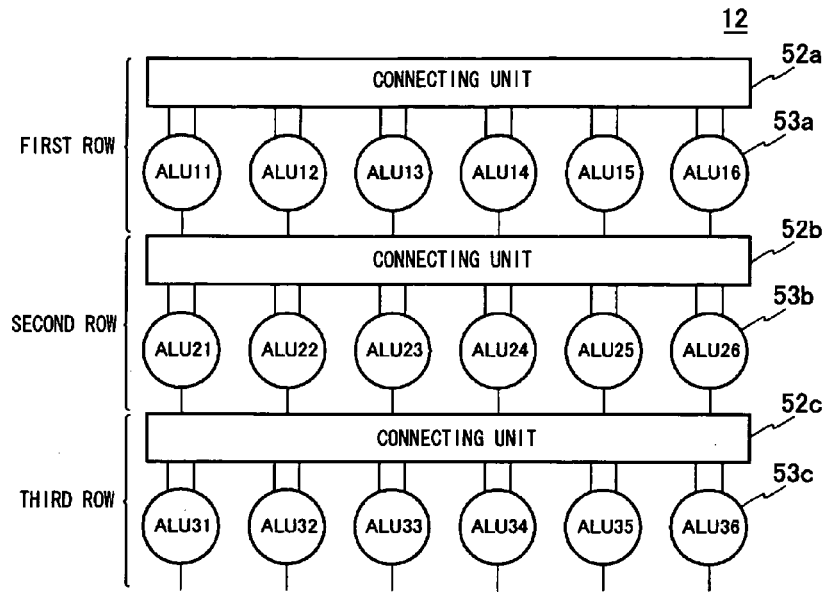
FIG. 2 shows an example of a reconfigurable circuit.

FIG. 2 shows an example of structure of the reconfigurable circuit 12. The reconfigurable circuit 12 is provided with an array comprising a plurality of rows of logic circuits each capable of selectively executing any of a plurality of operating functions, and connection units 52 each capable of configuring the connectivity between outputs of logic circuits in a front row and inputs of logic circuits in a back-end row.

In the reconfigurable circuit 12, operations proceed from top to bottom in the structure comprising multiple rows of logic circuits. The term "multiple rows" refers to a plurality of rows. The circuit structure of the reconfigurable circuit 12 may not necessarily be a multiple-row array. For of circuit scale, it is preferable to achieve connections between some of the logic circuits instead of enabling the connection between all of the logic circuits.

The reconfigurable circuit 12 is provided with an arithmetic logic unit as a logic circuit. An ALU is an arithmetic logic circuit capable of selectively executing any of a plurality of types of multi-bit operations. More specifically, an ALU is capable of selectively executing any of plurality of types of multi-bit operations such as logical sum, logical product and bit shift, according to the configuration. Each of the ALUs is provided with a selector for configuring the unit for any of a plurality of operating functions. In the illustrated example, each ALU is provided with two input terminals and one output terminal.

The reconfigurable circuit 12 is formed as an X-row Y-column ALU array provided with a total of X ALUs in the vertical direction and a total of Y ALUs in the horizontal direction. A 3-row 6-column ALU array provided with a total of three ALUs in the vertical direction and a total of six ALUs in the horizontal direction is illustrated.

The reconfigurable circuit 12 is provided with connecting units 52 and ALUs 53. The ALUs 53 are organized into a plurality of rows. Each connecting unit 52 is provided between the ALUs in the front row and the ALUs in the back-end row and configures the connectivity between outputs of ALUs in the front row and inputs of ALUs in the back-end row.

In the example illustrated in FIG. 2, the connecting unit 52b constituting the second row is provided between the ALUs 53a in the first row and the ALUs 53b in the second row. The connecting unit 52c constituting the third row is provided between the ALUs 53b in the second row and the ALUs 53c in the third row. The connecting unit 52a constituting the first row is provided above the ALUs in the first row.

Input variables and constants are input to an ALU11, an ALU12, . . . an ALU16 in the first row so that operations designated by the configuration are performed. The outputs of the results of operations are input to an ALU21, an ALU22, . . . an ALU26 in the second row in accordance with the connection established in the connection unit 52b in the second row.

The connection unit 52b in the second row is wired to establish arbitrary connectivity between outputs of the ALUs 53a in the first row and inputs of the ALUs 53b in the second row, or connectivity selected from predefined combinations of connectivity. The desired wiring is activated by configuration.

Outputs from the ALUs 53a are input to the ALU21, the ALU22, ... the ALU26 in the second row so that operations designated by the configuration are performed. The outputs of the results of operations are input to an ALU31, an ALU32, ... an ALU36 in the third row in accordance with the connection established by wiring in the connection unit 52c in the third row.

Output data from the ALUs 53c in the third are output to the output data holding unit 30. The output data holding unit 30 feeds the output data to the connection unit 52a via the route unit 32. The connection unit 52a configures the wiring for connection to supply data to the ALU11, the ALU12, ... the ALU16 in the first row. When the ultimate result of operation is generated, the output data holding unit 30 delivers the data outside the processing apparatus 10.

Figure 3:
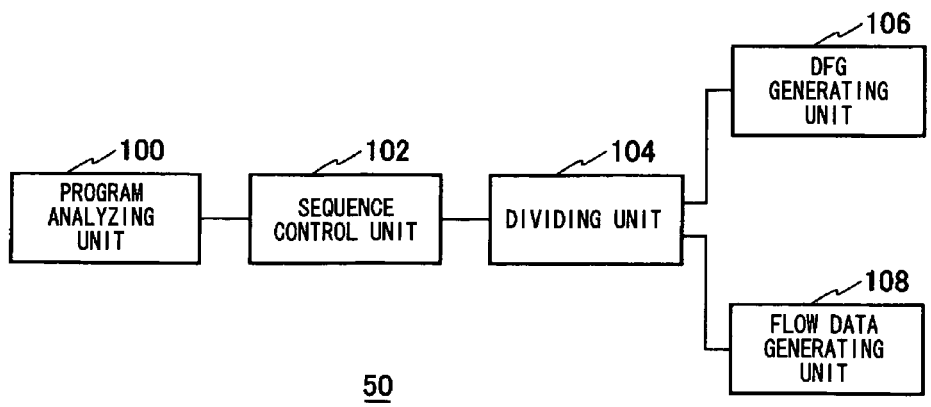
FIG. 3 shows the structure of a compile unit.

FIG. 3 shows the structure of compile unit 50. The compile unit 50 comprises a program analyzing unit 100, a sequence process unit 102, a dividing unit 104, a DFG generating unit 106 and a flow data generating unit 108.

The data flow graph processing function according to the illustrative example of the invention is implemented in the processing apparatus 10 by elements including a CPU, a memory and a DFG processing program loaded into the memory. FIG. 3 depicts functional blocks implemented by the cooperation of these. The DFG processing program may be built in the processing apparatus 10 or supplied from an external source in the form of a recording medium storing the program. Therefore, it will be obvious to those skilled in the art that the functional blocks may be implemented by a variety of manners including hardware only, software only or a combination of both.

Figures 4, 5:
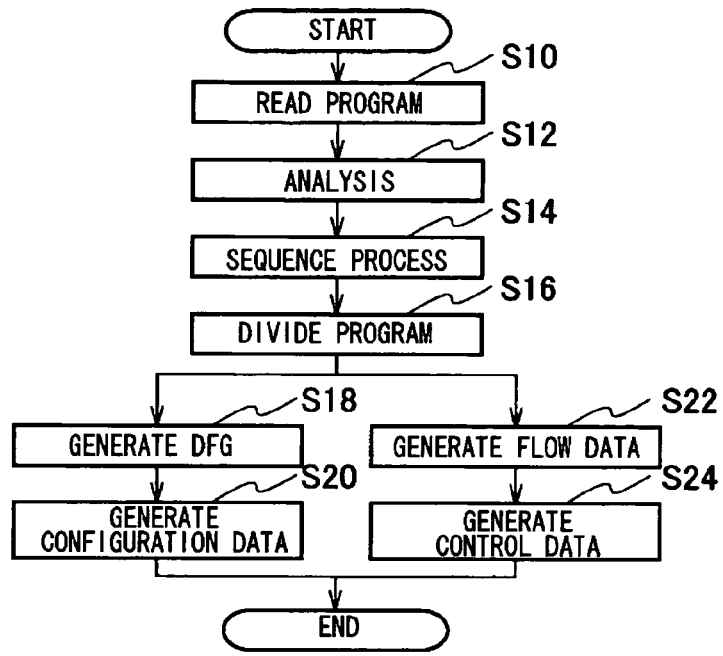
FIG. 4 is a flowchart of a DFG processing method according to the example.
FIG. 5 shows an example of a source program.

FIG. 4 is a flowchart of a DFG processing method according to the illustrative example of the invention. The program analyzing unit 100 reads a program stored in the storage unit 40 (S10) so as to analyze the program (S12).

The program analyzing unit 100 is a preprocessor for efficient execution of subsequent processes and performs, for example, expansion of functions included in a program. The sequence process unit 102 adds to the program operations for sequence process designation and branch condition, by referring to the description in the program (S14).

The sequence process in this illustrative example of the invention is a preprocess for dividing a program into a plurality of subprograms. The sequence process detects a branching process in a program and designates a sequence process. The dividing unit 104 divides the program into a plurality of subprograms by referring to the sequence process designation added by the sequence process unit 102 (S16). In this process, the dividing unit 104 retrieves each of the processes at the branch targets as a subprogram.

The DFG generating unit 106 generates for each subprogram a DFG suited to the circuit structure of the reconfigurable circuit 12 (S18) and stores the DFG in the storage unit 40. The flow data generating unit 108 generates the DFG flow data based on the program in which the sequence process designation and the branch condition are added and also based on the subprograms (S22).

The configuration data generating unit 51 generates configuration data for the reconfigurable circuit 12 from the generated DFG (S20). The control data generating unit 54 generates control data to be set in the sequencer apparatus 20 from the DFG flow data (S24).

FIG. 5 shows an example of a source program. In this program, func1 is called when func0 is executed. FIG. 6 shows the programs of FIG. 5 lumped together by expanding func1 in func0. The program analyzing unit 100 executes the expansion of functions. By expanding functions, sequence process designation and program division are executed later in an efficient manner. The sequence process unit 102 adds, to the program analyzed by the program analyzing unit 100, operations for sequence process designation and branch condition.

Figure 7:
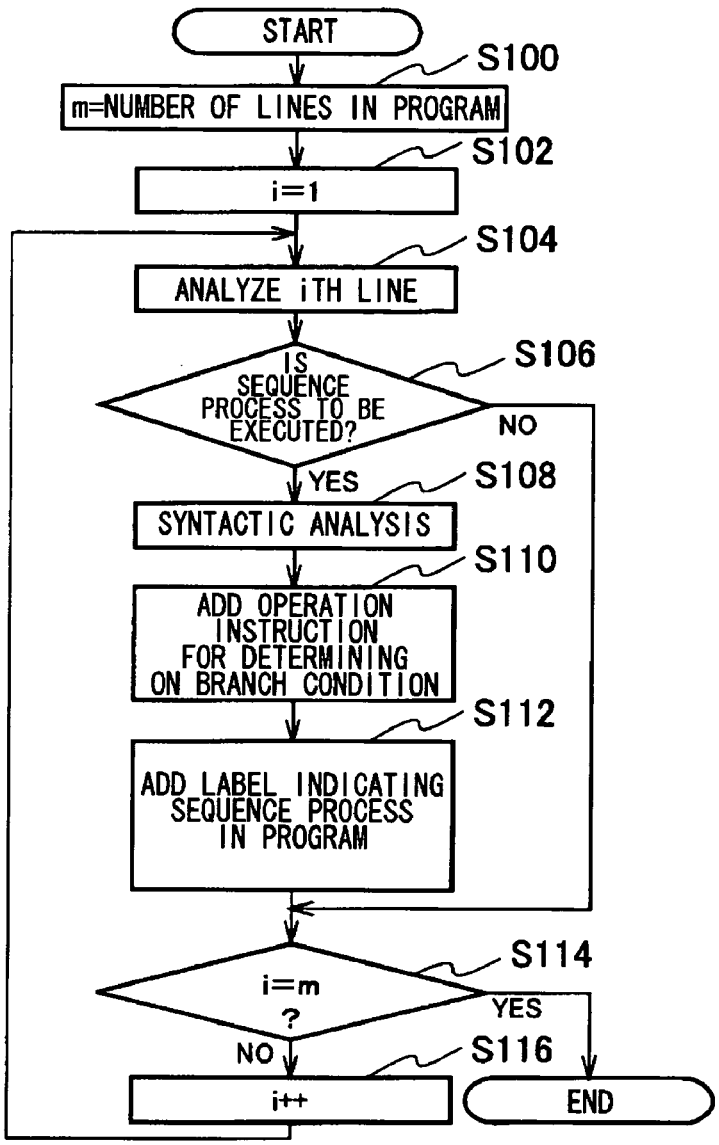
FIG. 7 is a flowchart showing the operation of the sequence process unit 102.

FIG. 7 is a flowchart showing the operation of the sequence process unit 102. The sequence process unit 102 sets m to the number of program lines (S100). The sequence process unit 102 refers to the program shown in FIG. 6. Since the program contains 10 lines, m=10. The sequence process unit 102 sets i to 1 (S102). The sequence process unit 102 analyzes the ith line of the program (S104) so as to examine whether the sequence process is to be executed on that line (S106).

A sequence process is a preprocess executed before dividing a program. The sequence process is executed when the mere generation of DFGs prohibits proper execution of operations as in the case of loop operation with an indefinite loop count. The sequence process may also be executed when circuit scale is reduced or performance such as processing speed is improved by performing a sequence process. Whether to execute a sequence process is determined in accordance with the function or process stated in the program.

In this illustrative example of the invention, a sequence process is executed when two or more operations are stated in a branch statement (for example, if statement), or when the loop count in a loop statement (for example, for statement) is indefinite or 10 or greater. By determining whether a sequence process is to be executed depending on whether the volume of process in the branch target exceeds a predetermined level, the configuration data to be supplied to the reconfigurable circuit 12 can be generated efficiently.

In the program of FIG. 6, the first line of the program states "int i;", which is neither a branch statement nor a loop statement. Therefore, the sequence process unit 102 does not perform a sequence process (N in S106). The sequence process unit 102 determines whether i is equal to m (S114). Since i=1 and m=10 (N in S114), the sequence process unit 102 increments i by 1 (S116) so as to set i to 2.

Control is returned to S104. Since the second line of the program states "x+=1;", the sequence process unit 102 determines similarly that a sequence process is not executed (N of S106). The sequence process unit 102 increments i by 1 (S116) and sets i to 3. The third line of the program states "if(*y>0) {".

As described before, the condition for execution of a sequence process is that two or more operations are stated. Referring to the operations in the if statement, two operations "x=x>>2;" and "*y-=x+3;" are stated so that the sequence process unit 102 determines that a sequence process should be executed (Y of S106).

Subsequently, the sequence process unit 102 executes syntactic analysis of the program so as to select the range of sequence process and the branch condition (S108). In this case, the range of sequence process is "if( ) { ... }" and the branch condition is "*y>0". Subsequently, the sequence process unit 102 adds to the program an operation instruction for determining whether the branch condition is fulfilled (S110).

FIG. 8 is a program in which an operation instruction for determination is added before the if statement in the program shown in FIG. 6. In this example, the operation instruction for determination is "_SEQ_=*y>0;". The branch condition is "*y>0". The sequence process unit 102 describes the if statement as "if(_SEQ_)" to indicate that a sequence process is to be executed in this part of the program (S112).

"if(_SEQ_)" is a sequence process designation indicating that a sequence process is to be executed in this part of the program. "_SEQ_" represents a variable corresponding to an output signal from the reconfigurable circuit 12 required for branch selection.

When operations are executed in the reconfigurable circuit 12, _SEQ_ is supplied as branch control data from the reconfigurable circuit 12 to the sequencer apparatus 20. The sequencer apparatus 20, receiving the branch control data _SEQ_, refers to the control data held in the apparatus so as to generate a read address of the configuration data for the DFG to be subsequently executed. The sequencer apparatus 20 supplies the read address thus generated to the configuration data holding unit 14.

Subsequent to S112, the sequence process unit 102 determines whether i is equal to m (S114). Since i=3 and m=10 (N in S114), the sequence process unit 102 increments i by 1 (S116) and sets i to 4.

Since the fourth line of the program states "x=x>>2;", the sequence process unit 102 does not perform a sequence process (N in S106). The sequence process unit 102 increments i by 1 so that i=5 (S116). Thereafter, the flow is executed as described. When i=s, the eighth line of the program states "for (i=0; i<100; i++) {". As described before, the condition for sequence process in a for statement is that the loop count is indefinite or 10 or greater. The loop count in the for sentence in this case is 100. Therefore, the sequence process unit 102 determines that a sequence process should be executed (Y in S106).

The sequence process unit 102 executes the syntactical analysis of the program so as to select the range of sequence process and the branch condition (S108). In this case, the range of sequence process is "for( ) { . . . }" and the branch condition is "i<100". The sequence process unit 102 then adds an operation instruction for determining whether the branch condition is fulfilled (S110). Since the branch condition is "i<100", the sequence process unit 102 adds an operation instruction for determination "_SEQ_=i<100;" at the end of the for sentence, as shown in FIG. 8. Also, "i=0;" for initializing i is added before the for sentence.

The sequence process unit 102 describes the for statement as "do{ . . . } while(_SEQ_);" so as to indicate that a sequence process is to be executed in this part of the program (S112). "do{ . . . }while (_SEQ_);" is a sequence process designation indicating that a sequence process is to be executed in this part of the program. In this case, the loop count is fixed at 100. When, for example, the loop count is indefinite as in the case of a branch condition "i<*y", an operation instruction for determination "_SEQ_=i<*y;" is added at end of the for statement and before the for statement.

Subsequently, the sequence process unit 102 determines whether i is equal to m (S114). Since i=8 and m=10 (N in S114), the sequence process unit 102 increments i by 1 (S116) so as to set i to 9. Thereafter, the flow is executed as described. When i=10, i=m (Y in S114), whereupon the sequence process unit 102 terminates the sequence process. The sequence process as described above generates a program shown in FIG. 8 with sequence process designation. The dividing unit 104 divides the program into subprograms in accordance with the sequence process designation.

Figure 9:
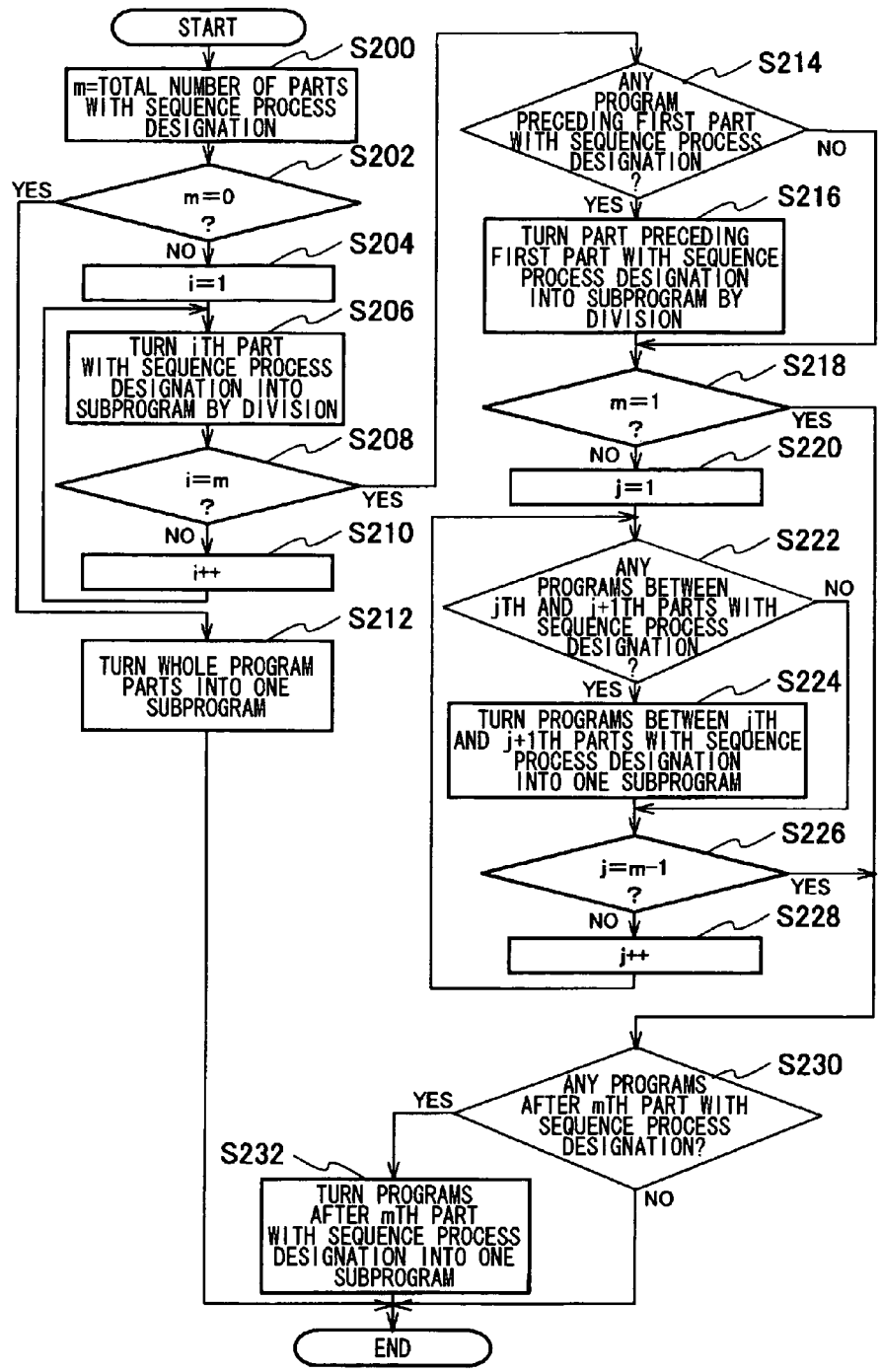
FIG. 9 is a flowchart showing the operation of a dividing unit.

FIG. 9 is a flowchart showing the operation of the dividing unit 104. Initially, the dividing unit 104 sets m to the total number of program parts with sequence process designation (S200). In the program shown in FIG. 8 with sequence process designation, a sequence process is designated at two parts "if(_SEQ_) { . . . }" and "do{ . . . }while(_SEQ_)". Therefore, the dividing unit 104 sets m to 2.

Subsequently, the dividing unit 104 determines whether m is equal to 0 (S202). If m=0 (Y of S202), the dividing unit 104 terminates the dividing process, assuming the whole program as a subprogram (S212). In this case, m=2 (N of S202) so that the dividing unit 104 sets i to 1 (S204).

Subsequently, the dividing unit 104 turns the program part with the ith sequence process designation into a subprogram by division (S206). Referring to FIG. 8, the part with the first sequence process designation is "if(_SEQ_) { . . . }" so that the dividing unit 104 turns this part into a subprogram by division.

FIG. 10 shows a plurality of subprograms ultimately generated by dividing the program shown in FIG. 8. "if(_SEQ_) { . . . }" is extracted as a subprogram listed as func02 in FIG. 10.

"if(_SEQ_)" in the program corresponds to a determination as to whether func02 is to be executed. The determination is made by the sequencer apparatus 20 by referring to the value of _SEQ_ output from the reconfigurable circuit 12 shown in FIG. 1. Accordingly, the operations "x=x>>2;" and "*y-=x+3;" are turned into DFGs. Since "if(_SEQ_)" need not be turned into a DFG, it is not introduced into the subprogram.

Subsequently, the dividing unit 104 determines whether i is equal to m (S208). Since i=1 and m=2 (N in S126), the dividing unit 104 increments i by 1 (S210) and sets i to 2.

Control is returned to S206. Since the part with the second sequence process designation is "do{ . . . } while(_SEQ_);", the dividing unit 104 similarly turns this part into a subprogram by division. "do{ . . . }while (_SEQ_);" is extracted as a subprogram listed as func04 in FIG. 10.

Subsequently, the dividing unit 104 determines whether i is equal to m (S208). Since i=2 and m=2 (Y in S208), control is turned to S214. This completes the process of turning the program parts with sequence process designation into subprograms.

Subsequently, the dividing unit 104 turns the other parts of the program into subprograms. Firstly, the dividing unit 104 determines whether there is a program preceding the program with the first sequence process designation (S214). Since there is a program preceding the program "if(_SEQ_) { . . . }" with the first sequence process designation (Y in S214), the dividing unit 104 turns that program into a subprogram (S216). With this, the subprogram listed as func01 in FIG. 10 is generated.

Subsequently, the dividing unit 104 determines whether m is equal to 1 (S218). In case there are no programs preceding the program with the first sequence process designation (N in S214), the dividing unit 104 immediately executes the determination of S218. In this example, m=2 (N in S218) so that the dividing unit 104 sets j to 1 (S220).

Subsequently, the dividing unit 104 determines whether there are programs between the program with the jth sequence process designation and the program with the (j+1) th sequence process designation (S222). In this case, there is a program between the program "if(_SEQ_) { . . . }" with the first sequence process designation and the program "do{ . . . }while (_SEQ_);" with the second sequence process designation (Y in S222), the dividing unit 104 turns the intervening program into a subprogram (S224). With this, the subprogram listed as func03 in FIG. 10 is generated.

Subsequently, the dividing unit 104 determines whether j is equal to m−1 (S226). In this example, j=1 and m=2 so that j=m−1 (Y in S226). Therefore, the dividing unit 104 determines whether there are any programs subsequent to the program with the mth sequence process designation (S230).

In this case, there are no programs subsequent to the program "do{ . . . }while (_SEQ_);" with the second sequence process designation (N in S230). Therefore, the dividing unit 104 terminates the flow.

When it is determined that m is equal to 1 in S218 (Y in S218), control is turned to S230, whereupon the dividing unit 104 determines whether there are any programs subsequent to the program with the first sequence process designation. When there are programs (Y in S230), the dividing unit 104 turns the part subsequent to the program with the mth sequence process designation into a subprogram by division (S232).

When it is determined that j is not equal to (m−1) in S226 (N in S226), the dividing unit 104 increments j by 1 (S228) and returns to S222 so as to determine whether there are any programs between programs with sequence process designation.

Figure 11:
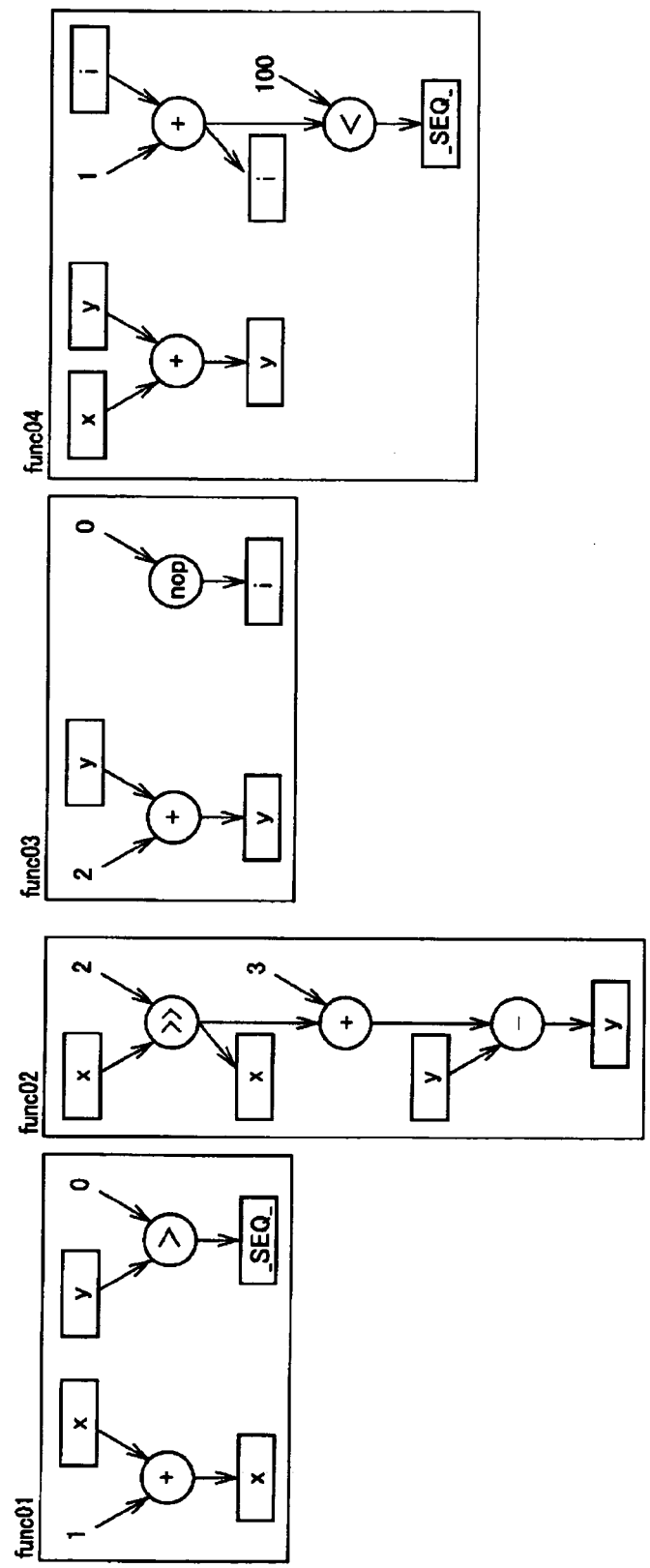
FIG. 11 shows DFGs generated by the DFG generating unit.

The subprograms shown in FIG. 10 are generated as a result of the dividing process described above. The DF generating unit 106 turns the subprograms of FIG. 10 into DFGs. FIG. 11 shows the DFGs generated by the DFG generating unit 106. The configuration data generating unit 51 generates the configuration data to be supplied to the reconfigurable circuit by referring to the DFGs.

Subsequently, the flow data generating unit 108 generates the DFG flow data by referring to the program shown in FIG. 8 with sequence process designation and to the subprograms shown in FIG. 10.

Figure 12:
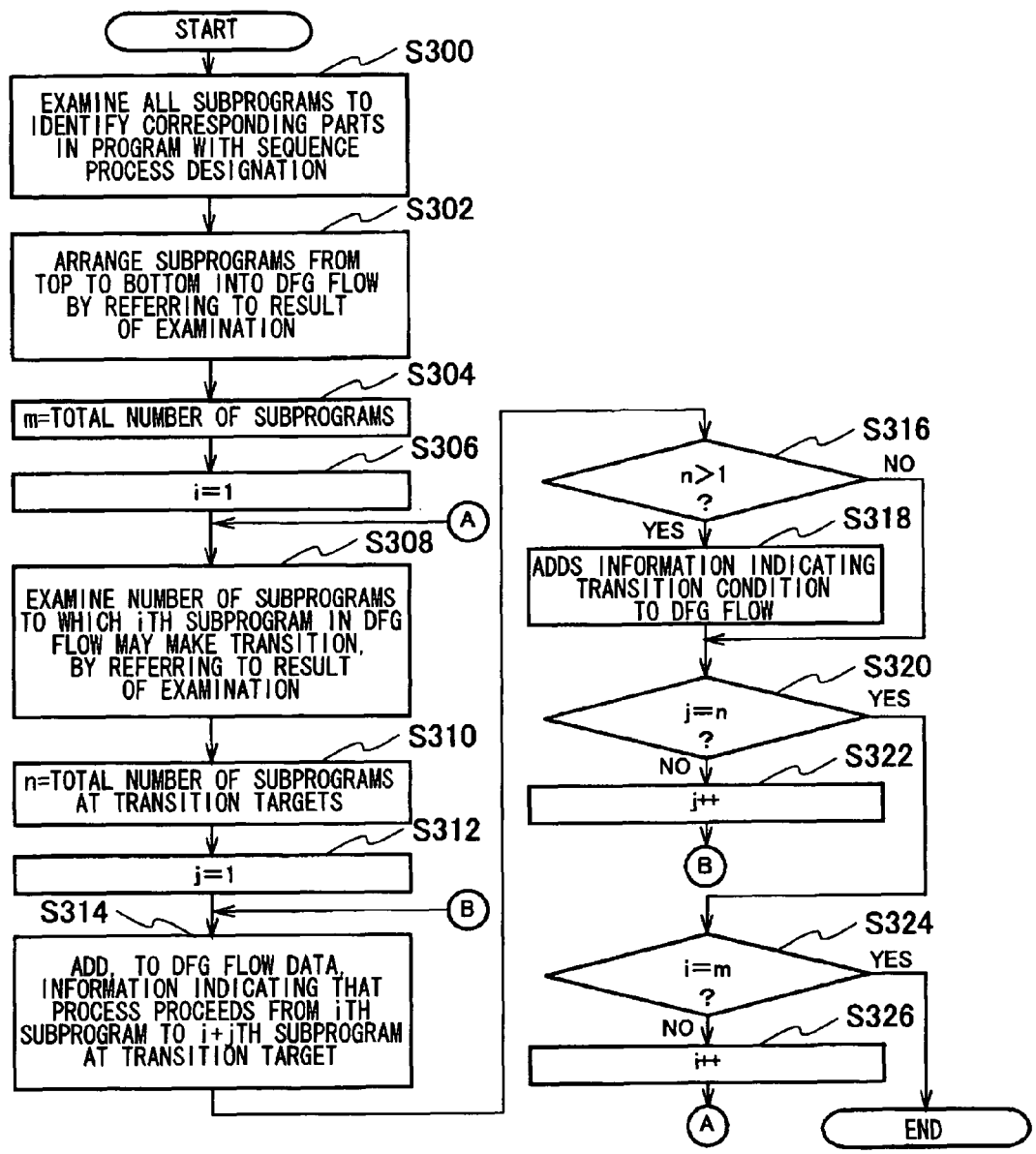
FIG. 12 is a flowchart showing the operation of a flow data generating unit.
Figures 13, 14:
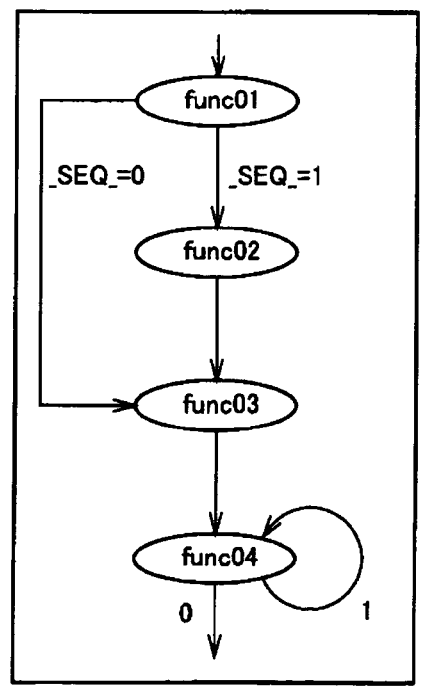
FIG. 13 shows a flow program.
FIG. 14 shows DFG flow data.

FIG. 12 is a flowchart showing the operation of the flow data generating unit 108. Initially, the flow data generating unit 108 examines all subprograms in FIG. 10 so as to identify the corresponding parts in the program of FIG. 8 with sequence process designation (S300). With this, the flow data generating unit 108 examines the connectivity between the subprograms, i.e., the connectivity between the DFGs. In this process, the flow data generating unit 108 replaces the operations in the program of FIG. 8 by func01 through func04 of FIG. 10. FIG. 13 shows a flow program in which the operations in the program are replaced by func01 through func04.

Subsequently, the flow data generating unit 108 arranges the subprograms in the flow program from top to bottom, by referring to the result of examination in S300 (S302). With this, the order of execution of the DFGs is determined and the DFGs are arranged in the order of execution.

FIG. 14 shows DFG flow data. The most upstream subprogram in the flow program of FIG. 13 is func01. Therefore, as shown in FIG. 14, the flow data generating unit 108 places func01 at the top of the DFG flow data. Since the subprogram occurring next is func02, the flow data generating unit 108 places func02 in the second row, as shown in FIG. 14. The flow data generating unit 108 continues similarly so as to place func03 in the third row and func04 in the fourth row.

Subsequently, the flow data generating unit 108 sets m to the total number of subprograms (S304). Since the total number of subprograms shown in FIG. 10 is 4, the flow data generating unit 108 sets m to 4. The flow data generating unit 108 also sets i to 1 (S306). The flow data generating unit 108 examines the number of subprograms to which the ith subprogram may make a transition to, by referring to the result of examination (S308).

In this example, i=1. Referring to the flow program of FIG. 13, the subprogram executed subsequent to the first subprogram func01 is func02 or func03. Therefore, the total number of subprograms to which a transition from func01 may occur is 2 and so the flow data generating unit 108 sets n to 2 (S310).

The flow data generating unit 108 also sets j to 1 (S312).

The flow data generating unit 108 adds, to the DFG flow data, information indicating that the process proceeds from the ith subprogram to the i+jth subprogram at the transition target (S314). In this example, as shown in FIG. 14, the flow data generating unit 108 connects the first subprogram func01 to the subprogram func02, the first transition target.

Subsequently, the flow data generating unit 108 determines whether n is greater than 1 (S316). Since n=2 (Y in S316), the flow data generating unit 108 adds information indicating a transition condition to the DFG flow data (S318). Referring to FIG. 13, transition to func02 takes place when _SEQ_=1. Therefore, the flow data generating unit 108 adds "_SEQ_=1" as the condition for transition from func01 to func02.

The flow data generating unit 108 determines whether j is equal to n (S320). Since j=1 and n=2, the flow data generating unit 108 increments j by 1 (S322) so that j=2.

Referring back to S314, the flow data generating unit 108 establishes connection to indicate that the process proceeds from the first subprogram func01 to the second target subprogram func03, in a manner as already described. The flow data generating unit 108 adds information "_SEQ_=0" indicating the transition condition. The flow data generating unit 108 determines whether j is equal to n (S320). Since j=2 and n=2 (Y in S320), the flow data generating unit 108 determines whether i is equal to m (S324). Since i=1 and m=4 (N in S324), the flow data generating unit 108 increments i by 1 (S326) so that i=2.

Control is returned to S308, whereupon it is found by referring to the flow program of FIG. 13 that the second subprogram func02 makes a transition only to the subprogram func03. The total number of subprograms to which a transition from func02 occurs is 1 (S310). Therefore, the flow data generating unit 108 sets n to 1. The flow data generating unit 108 also sets j=1 (S312) The flow data generating unit 108 connects from func02 to func03 (S314).

The flow data generating unit 108 determines whether n is greater than 1 (S316). Since n=1 (N in S316), the flow data generating unit 108 need not add any information indicating a transition condition. The flow data generating unit 108 determines whether j is equal to n (S320). Since j=1 and n=1 (Y in S320), the flow data generating unit 108 then determines whether i is equal to m (S324). Since i=2 and m=4 (N in S324), the flow data generating unit 108 increments i by 1 (S326) so that i=3.

Control is returned to S308, whereupon connection is established from the third subprogram func03 to func04. The flow data generating unit 108 increments i by 1 so that i=4. Referring to the flow program of FIG. 13, the subprogram to be executed subsequent to the fourth subprogram func04 is func04 or "process termination".

The total number of subprograms to which a transition from func04 takes place is 2. Therefore, the flow data generating unit 108 sets n to 2. By allowing the flow data generating unit 108 to establish connections and add transition conditions, the DFG flow data shown in FIG. 14 is ultimately generated. When i is equal to m at the end (Y in S324), the flow data generating unit 108 terminates the entire process.

FIG. 14 is a schematic illustration of the DFG flow data. Actually, the DFG flow data representing the information of FIG. 14 in numeral data is generated. By referring to the DFG flow data of FIG. 14, the control data generating unit 54 generates the control data used by the sequencer apparatus 20 for selection of the configuration data. The control data is supplied to the sequencer apparatus 20 for storage therein.

In the illustrative example of the invention, extraction of programs intervening between two programs with sequence process designation is described. The compile unit 50 also addresses a case where there are additional sequence process designations inside a program with sequence process designation.

Figures 15, 16:
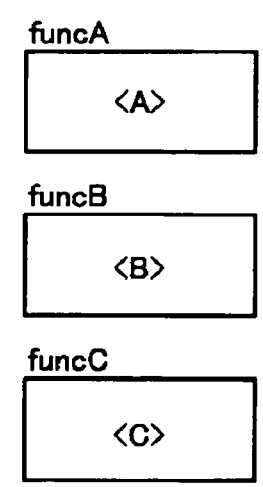
FIG. 15 shows a program with sequence process designation.
FIG. 16 shows a plurality of subprograms generated by a dividing unit.
Figure 17:
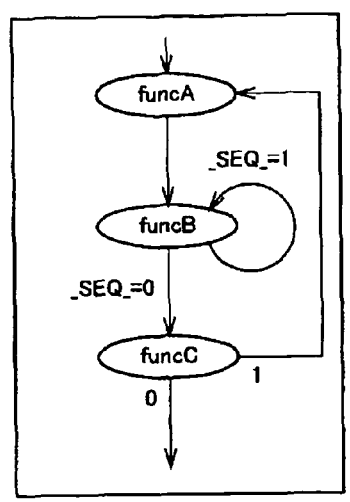
FIG. 17 shows DFG flow data generated by a flow data generating unit.

If, for example, a for sentence with sequence process designation is located in a for sentence with sequence process designation, the sequence process unit 102 generates a program with sequence process designation as shown in FIG. 15. The dividing unit 104 then turns programs <A>, <B> and <C> into programs with sequence process designation by division. FIG. 16 shows a plurality of subprograms generated by the dividing unit. FIG. 17 shows the DFG flow data generated by the flow data generating unit 108.

Figure 18:
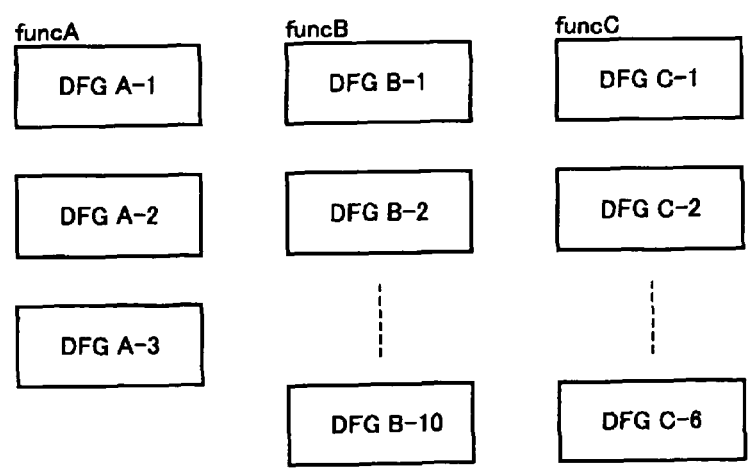
FIG. 18 shows a plurality of DFGs generated from a subprogram.

In generating DFGs from the subprograms so as to be suited to the circuit structure of the reconfigurable circuit 12, the DFG generating unit 106 may generate a plurality of DFGs from a single subprogram. For example, as shown in FIG. 18, the DFG generating unit 106 may generate a plurality of DFGs from each of subprograms shown in FIG. 16.

The flow involving funcA, funcB and funcC is as shown in FIG. 17. In this case, "funcA" in FIG. 17 is replaced by three DFGs belonging to funcA arranged in the order of execution. A similar situation holds true for funcB and funcC. Accordingly, such a case is addressed by the flow data generating unit 108 by adding the process of replacement after generating the DFG flow data for funcA, funcB and funcC.

Figure 19:
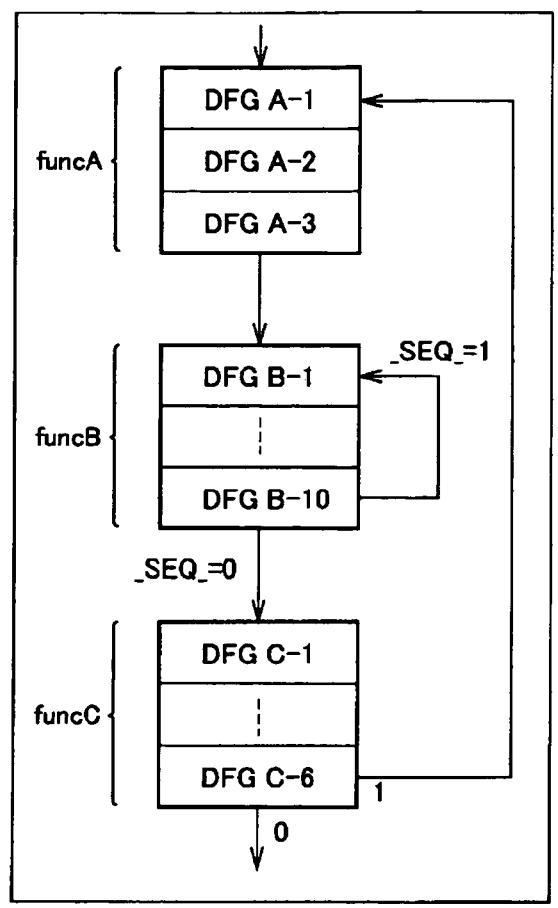
FIG. 19 shows DFG flow data.

Assuming that the order of execution in the DFG belonging to funcA is such that DFGA-1, DFGA-2 and DFGA-3 and that a similar situation holds true of funcB and funcC, the DFG flow data is as shown in FIG. 19. The execution of DFGs inside funcA, funcB and funcC is determined without referring to _SEQ_. When a branch occurs between funcs, the next func to be executed is determined in accordance with _SEQ_.

In this illustrative example of the invention, the program analyzing unit 100 expands func1 of FIG. 5 in func0 so as to form a single function as shown in FIG. 6. Assuming that func0 and func1 are turned into DFGs independently, "x+=1;" and "_SEQ_=*y>0;" are turned into different subprograms. This is does not result in generating a single subprogram func01 and causes the number of subprograms to be increased.

If the number of subprograms is increased, the number of DFGs ultimately generated is increased. This may bring about degradation in processing performance and increase in circuit scale. For this reason, the program analyzing unit 100 performs the process of lumping together a plurality of functions to form a single function in order to minimize the number of divisions and the number of subprograms.

Described above is an explanation of the invention based on the illustrative example. The example of the present invention is only illustrative in nature and it will be obvious to those skilled in the art that various variations in constituting elements and processes are possible within the scope of the present invention.

FIG. 20 shows an example of a source program. In this source program, comments "/*_SEQ_*/" are introduced in a description in C. The comment is inserted by a programmer at the time of programming to indicate a sequence process.

In C language, a character string bounded by "/ . . . /" is handled as a comment. An ordinary compiler neglects comments at the time of compilation. In a variation which will be described below, the sequence process unit 102 determines whether there are comments, or statements not describing target operations. When a comment designating a sequence process is added, the comment is recognized as a sequence process designation.

With this approach, users are capable of designating a sequence process as desired. By designating a sequence process in the form of a comment, the operation in a C description is not affected.

FIG. 21 shows an example of a program with sequence process designation. When a sequence process designation such as "func1/*_SEQ_*/( );" of FIG. 20 described by a programmer is located in a function, the dividing unit 104 recognizes that part of the function as a sequence process designation and extracts the range defined by the comment as a subprogram.

When a function is called from a plurality of locations, a typical approach is to expand it at all locations, generating DFGs in which the same operation is repeated at a plurality of locations. By providing a sequence process designation in a function, a single DFG for the repeated function is generated so that the DFG is called a plurality of times. In this way, the number of DFGs ultimately generated is reduced.

A point of note in designating a sequence process in a function is that the value of argument (variable) differs each time the function DFG is called. Therefore, it is necessary to deliver argument data of fund. In this example, the two lines immediately above and the line immediately below "func1/*_SEQ_*/( ) ;" in the program shown in FIG. 21 sequence process designation represent the delivery of argument data. When the data delivered is an array, the address of the array is delivered. In the case of a variable, the variable (numerical value) is delivered. The operation instruction for data delivery may be added in S110 of FIG. 7.

Figure 22:
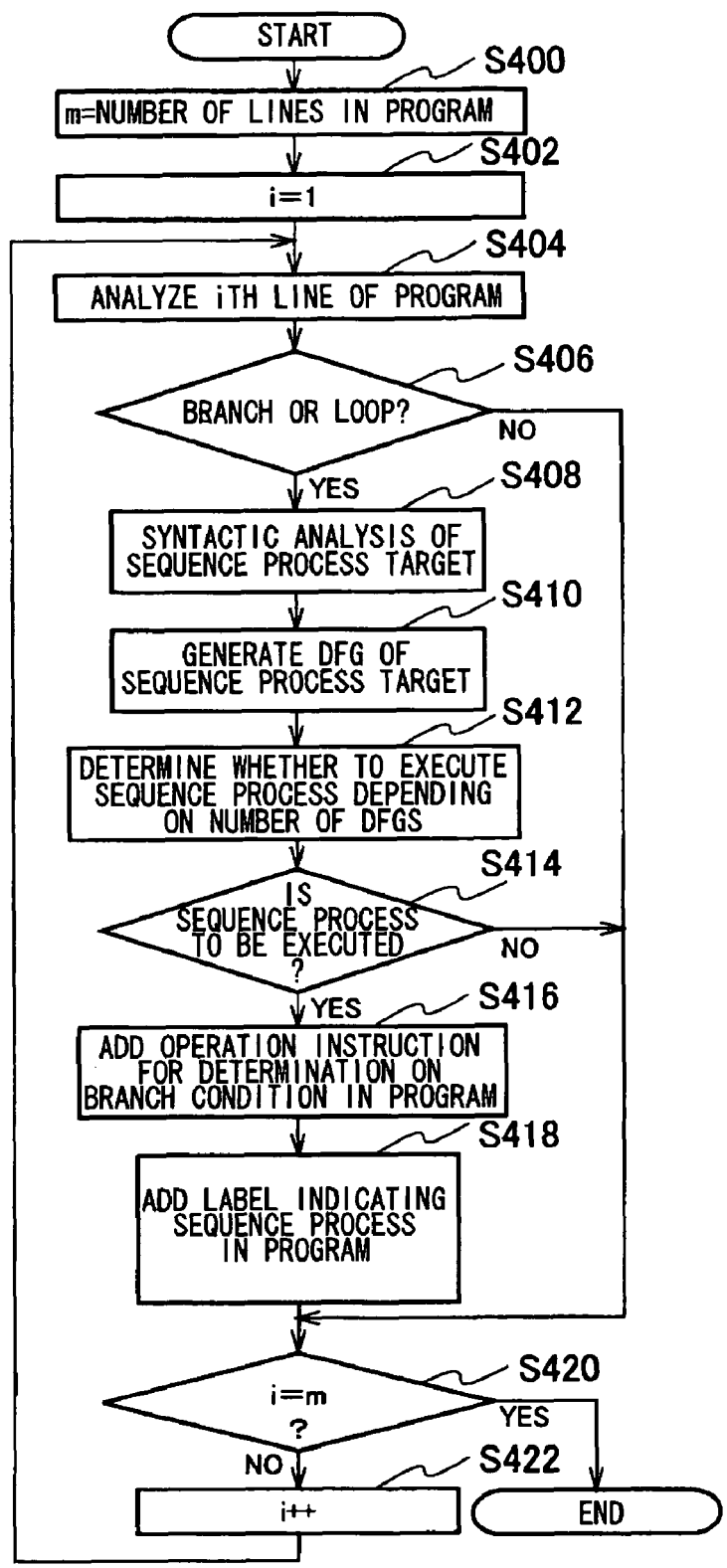
FIG. 22 is a flowchart showing the operation of a sequence process unit.

FIG. 22 is a flowchart showing another example of the operation of the sequence process unit 102. Firstly, the sequence process unit 102 sets m to the number of lines in the program (S400) More specifically, the sequence process unit 102 refers to the program shown in FIG. 23. Since the total number of lines in the program is 14, m is set to 14. The sequence process unit 102 then sets i to 1 (S402).

Subsequently, the sequence process unit 102 analyzes the ith line of the program (S104). The sequence process unit 102 determines whether the ith line of the program gives a specific description (S406). If an affirmative determination is yielded, the sequence process unit 102 proceeds to S408. In the case of a negative determination, the sequence process unit 102 proceeds to S420.

Examples of specific description include a description (for example, a branch statement such as an if statement) to indicate a condition for making a transition from an operation to any of a plurality of operations that are branch targets. Also included is a description (for example, a loop statement such as a for statement) to indicate a condition for causing the same operation to be executed a plurality of times.

It is found in S406 that the first line of the program is "int i;", which is not a specific description (branch statement or loop statement). Therefore, the sequence process 102 proceeds to S420. The sequence process unit 102 determines whether i is equal to m (S420). Since i=1 and m=14 (N in S420), the sequence process unit 102 increments i by 1 (S422) so that i=2.

Returning to S204, the sequence process unit 102 finds that the statement in the second line of the program is "x+=1;" and determines that the description is not a specific description (branch statement or loop statement) (N in S406). The sequence process unit 102 increments i by 1 so that i=3 (S420).

Returning to S404, the sequence process unit 102 finds that the statement in the third line of program is "if(*y>0) {", a specific description (branch statement). Therefore, the sequence process unit 102 executes the syntactical analysis of the description and select of the range of sequence process and the branch condition. In this case, the range of sequence process is "if( ) { ... }", "else{ ... }" and the branch condition is "*y>0".

A sequence process is a preprocess performed before dividing a program. A sequence process is executed when the circuit scale of the reconfigurable circuit 12 is reduced or performance such as processing speed is improved by dividing the program.

Subsequently, the sequence process unit 102 generates a DFG corresponding to the subprogram in the specific description (S410). In this example, the sequence process unit 102 generates DFG1 corresponding to "x=x>>2;", "y-=3;" and "*z+=4" in the if sentence (specific description) (see DFG1 shown in FIG. 24). The sequence process unit 102 also generates DFG2 corresponding to "x=5;" in the else statement (specific description) (see DFG2 shown in FIG. 24).

The sequence process unit 102 determines whether to execute a sequence process in accordance with the number of execution steps in the reconfigurable circuit 12 corresponding to DFG1 (or DFG2) thus generated. An execution step according to this embodiment is a process executed in each of the rows shown in FIG. 2. An execution step may be a process executed in each of two or more rows.

According to this embodiment, a sequence process is executed when the number of execution steps in the reconfigurable circuit 12 corresponding to DFG1 (or DFG2) generated exceeds a first reference number (in this case, 3). When the number of execution steps in the reconfigurable circuit 12 corresponding to DFG1 (or DFG2) generated does not exceed the first reference number, a sequence process is not executed.

Figures 23, 24:
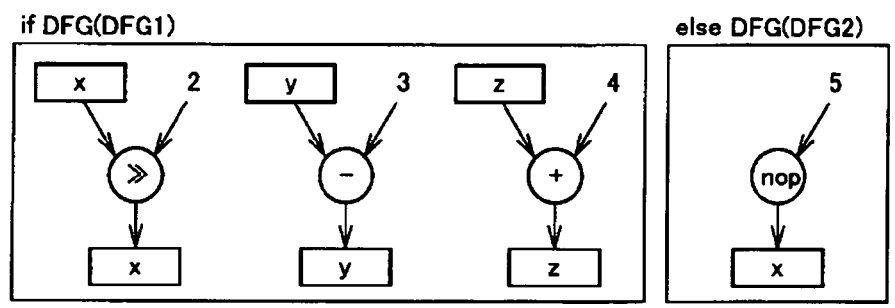
FIG. 23 shows an example of a source program.
FIG. 24 shows DFGs corresponding to subprograms.

For example, the operation corresponding to "x=x>>2;" in DFG1 shown in FIG. 24 corresponds to the ALU11 in the first row of the reconfigurable circuit 12. The operation corresponding to "y-=3;" in DFG1 corresponds to the ALU12 in the first row of the reconfigurable circuit 12. The operation corresponding to "*z+=4" in DFG1 corresponds to the ALU13 in the first row of the reconfigurable circuit 12.

Accordingly, DFG1 corresponds to ALUs in the first row of the reconfigurable circuit 12 and corresponds to only a single execution step (process in a single row). Similarly, DFG2 also corresponds to a single execution step. Thus, the number of execution steps in the reconfigurable circuit 12 corresponding to DFG1 and DFG2 generated is 1 and does not exceed the first reference number (in this case, 3). Therefore, the sequence process unit 102 determines that a sequence process is not to be executed.

Subsequently, the sequence process unit 102 determines whether i is equal to m (S420). Since i=3 and m=14 (N in S420), the sequence process unit 102 increments i by 1 (S422) so that i=4. Since the description in the fourth line of the program is "x=x>>2;" and is not a specific description (N in S406), the sequence process unit 102 increments i by 1 (S422) so that i=5. Thereafter, the flow is executed as described.

Returning to S404, the sequence process unit 102 finds that, when i=12, the twelfth line of the program states "for (i=0; i<100; i++) {" (specific description) (Y in S406). The sequence process unit 102 executes the syntactical analysis of the program so as to select the range of sequence process and the branch condition (S408). In this case, the range of sequence process is "for( ) { ... }" and the branch condition is "i<100".

Subsequently, the sequence process unit 102 generates DFG3 corresponding to the description included in the for statement (S410, see DFG3 shown in FIG. 25). In DFG3, a repeat process with repeat count of 100 is executed.

The first operation executed in DFG3 corresponds to the ALU11 in the first row of the reconfigurable circuit 12. The second process corresponds to the ALU21 in the second row of the reconfigurable circuit 12.

The repeat process in DFG3 with a repeat count of 100 is executed in successive rows of the reconfigurable circuit 12. Therefore, the number of rows (including those rows that are used repeatedly) in the reconfigurable circuit 12 corresponding to DFG3 is 100 and the number of execution steps is 100. The number of execution steps in the reconfigurable circuit 12 corresponding to DFG3 generated is 100, which exceeds a second reference number (in this case, 10). Therefore, the sequence process unit 102 determines that a sequence process is to be executed (Y in S414).

Subsequently, the sequence process unit 102 adds to the program an operation instruction for determining whether the branch condition is fulfilled (S416). Since the branch condition is "i<100", the sequence process unit 102 adds an operation instruction for determination "_SEQ_=i<100;" at the end of the for statement, as shown in FIG. 26. The sequence process unit 102 also adds "i=0;" to precede the for statement for initialization if i.

The sequence process unit 102 describes the for statement as "do{ ... } while(_SEQ_);" so as to indicate that a sequence process is to be executed in this part of the program (S418). "do{ ... } while(_SEQ_);" is a sequence process designation indicating that a sequence process is to be executed in this part of the program.

Subsequently, the sequence process unit 102 determines whether i is equal to m (S420). Since i=12 and m=14 (N in S420), the sequence process unit 102 increments i by 1 (S422) so that i=13. The sequence process unit 102 continues to execute the flow as described and determines that i=m when i=14 (Y in S420), whereupon the sequence process 102 terminates the sequence process.

The sequence process as described above generates a program shown in FIG. 26 with sequence process designation. The dividing unit 104 divides the program into subprograms in accordance with the sequence process designation.

Figures 25, 26:
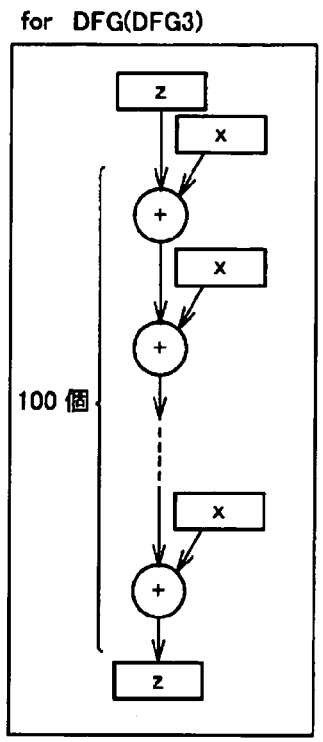
FIG. 25 shows DFGs corresponding to subprograms.
FIG. 26 shows a program in which an operation instruction for determination is added.

FIG. 26 is a program in which an operation instruction for determination is added before the for statement in the program shown in FIG. 23. In this example, "_SEQ_=i<100;" is an operation instruction for determination and "do{ ... }while (_SEQ_);" is a sequence process designation. Similarly to the process shown in FIG. 9, the sequence process unit 102 refers to the sequence process designation "do{ ... }while (_SEQ_);" so as to divide the program into a subprogram (func01) without sequence process designation and the other subprogram (func02) (see FIG. 27).

Figures 27, 28:
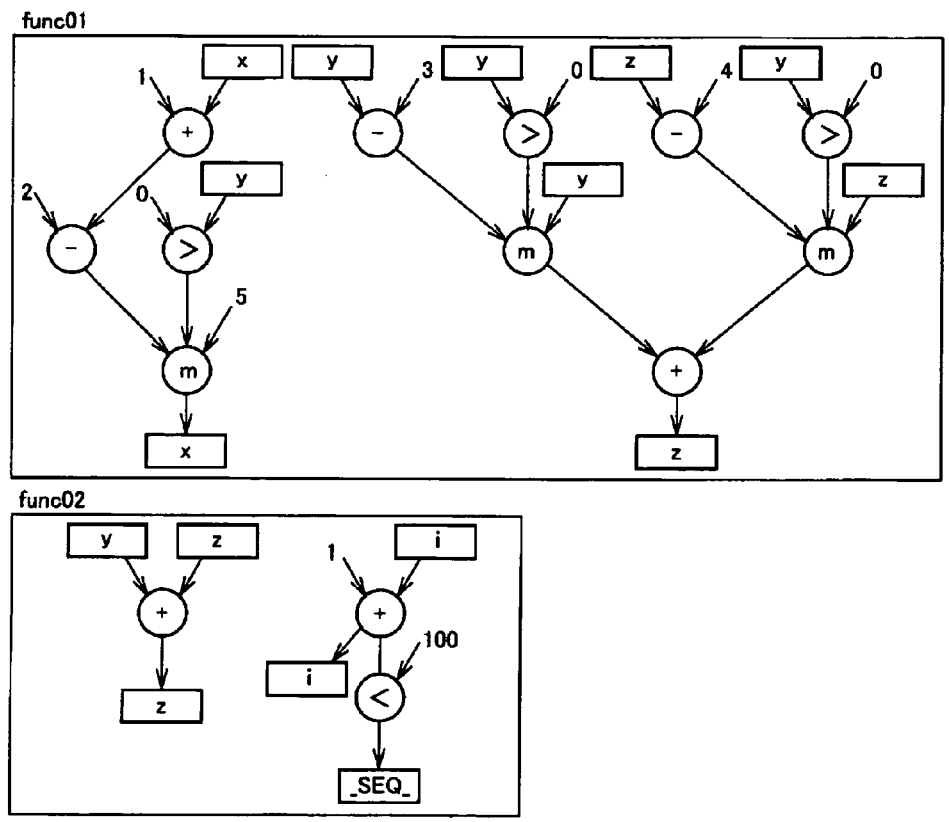
FIG. 27 shows a plurality of subprograms obtained by division.
FIG. 28 shows DFGs generated by a DFG generating unit.
Figures 29, 30:
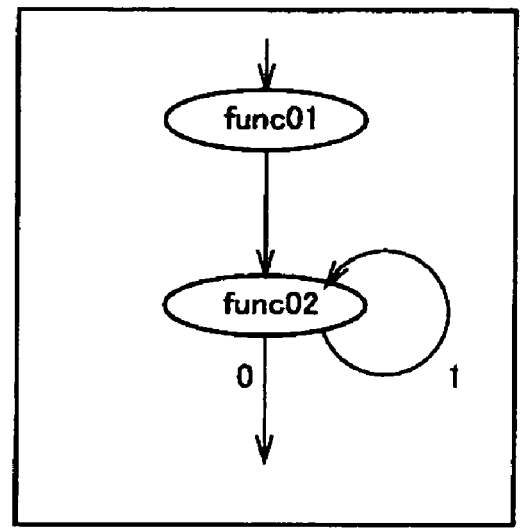
FIG. 29 shows a flow program.
FIG. 30 shows DFG flow data.

Subsequently, the DFG generating unit 106 generates a DFG corresponding to the subprogram (func01) and a DFG corresponding to the subprogram (func02) (see FIG. 28). The configuration data setting unit 51 generates configuration data to be supplied to the reconfigurable circuit 12 by referring to the DFGs thus generated. Similarly to the process shown in FIG. 12, the flow data generating unit 108 generates DFG flow data by referring to the program shown in FIG. 29 with sequence designation and the subprograms shown in FIG. 27 (see FIG. 30). The detailed process in the configuration data generating unit 51 and the flow data generating unit 108 is already described above so that the description thereof is omitted here.

In FIGS. 22 through 30, a DFG corresponding to a specific description (branch statement or loop statement) is generated. The program is divided into a plurality of subprograms in accordance with the number of execution steps in the reconfigurable circuit 12 corresponding to the DFG.

Therefore, the process in FIGS. 22 through 30 more successfully prevents the number of DFGs from increasing beyond what is necessary than the process in FIGS. 7 through 14. Accordingly, the capacity for storage of configuration data corresponding to the DFGs is reduced and circuit scale is further reduced accordingly.

Since the process in FIGS. 22 through 30 prevents the number of DFGs from increasing beyond what is necessary, the process in the reconfigurable circuit 12 is executed efficiently. Accordingly, the process in FIGS. 22 through 30 is capable of reducing power consumption by not allowing needless processes to be executed in the reconfigurable circuit 12.

Figure 31:
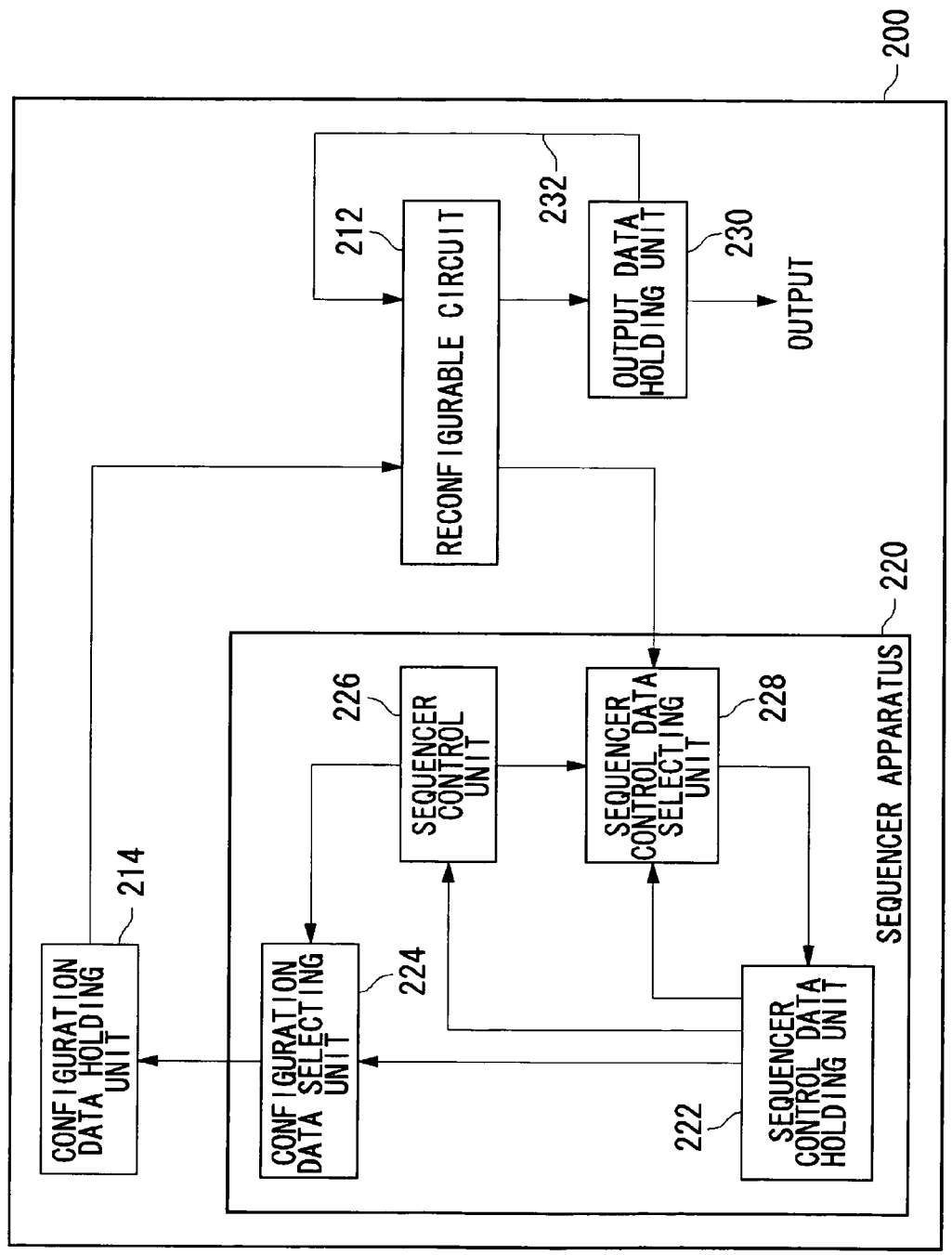
FIG. 31 shows a processing apparatus according to a variation.

FIG. 31 illustrates the structure of a processing apparatus 200 according to a variation of the present invention. The processing apparatus 200 is provided with a reconfigurable circuit 212, a configuration data holding unit 214, a sequencer apparatus 220, an output data holding unit 230 and a route unit 232. The processing apparatus 200 may be formed as an integrated circuit apparatus formed as a single chip. The function of the reconfigurable circuit 212 is modifiable by changing the configuration thereof.

The configuration data holding unit 214 holds a plurality of sets of configuration data for forming a target circuit in the reconfigurable circuit 212. The configuration data holding unit 214 supplies configuration data to the reconfigurable circuit 212 at predetermined intervals. The configuration data holding unit 214 may be formed as a command memory that outputs the stored configuration data by referring to a designated address value. In this case, the configuration data may be referred to as command data. The sequencer apparatus 220 is provided with the function of selecting the configuration data to be supplied to the reconfigurable circuit 212 from the plurality of sets of configuration data stored in the configuration data holding unit 214.

The reconfigurable circuit 212 is provided with logic circuits with modifiable functions. More specifically, the reconfigurable circuit 212 is provided with an array comprising a plurality of rows in each of which are provided logic circuits capable of selectively executing any of a plurality of operating functions. There is also provided connection units each of which is capable of configuring the connectivity between outputs of logic circuits in a front row to inputs of logic circuits in a back-end row. The plurality of logic circuits may be organized in a matrix. The function of each of the logic circuits and the connectivity between the logic circuits are configured in accordance with the configuration data supplied from the configuration data holding unit 214. The configuration data is supplied to the reconfigurable circuit 212 at predetermined time intervals so that the reconfigurable circuit 212 executes operations in accordance with the supplied configuration data. The reconfigurable circuit 212 may be similar to the reconfigurable circuit 12 shown in FIG. 2.

The route unit 232 functions as a feedback path and connects the output of the reconfigurable circuit 212 to the input of the reconfigurable circuit 212. The output data holding unit 230 is provided with a storage area for storing a data signal output from the reconfigurable circuit 212 and/or a data signal input from an external source. The data signal stored in the output data holding unit 230 is transmitted to the input of the reconfigurable circuit 12 via the route unit 232 and delivered outside the processing apparatus 200 in accordance with an instruction for output from a control unit (not shown).

The sequencer apparatus 200 is provided with a sequencer control data holding unit 222, a configuration data selecting unit 224, a sequencer control unit 226 and a sequencer control data selecting unit 228. The configuration data selecting unit 224 supplies a first selection signal for selecting configuration data to the configuration data holding unit 214. More specifically, the first selection signal designates a read address in the configuration data holding unit 214. The configuration data holding unit 214 outputs target configuration data to the reconfigurable circuit 212 by referring to the read address. The sequencer control data holding unit 222 holds sequencer control data for causing the configuration data selecting unit 224 to generate the first selection signal and supplies the sequencer control data to the configuration data selecting unit 224. The sequencer control data holding unit 222 is formed of a memory such as a RAM. With this, the process in the sequencer apparatus 220 can be easily modified by rewriting the sequencer control data. This enables various forms of control and enhances the versatility of the sequencer apparatus 220.

The sequencer control data selecting unit 228 supplies, to the sequencer control data holding unit 222, a second selection signal for selecting the sequencer control data supplied to the configuration data selecting unit 224. More specifically, the second selection signal designates a read address in the sequencer control data holding unit 222. The sequencer control data holding unit 222 outputs the target sequencer control data to the configuration data selecting unit 224 by referring to the read address.

The sequencer control data not only controls the configuration data selecting unit 224 but also contains data for controlling the operation of the sequencer control unit 226 and the sequencer control data selecting unit 228. Details will be described later. The sequencer control data selecting unit 228 generates a second selection signal by referring to control data supplied from the sequencer control data holding unit 222, data supplied from the sequencer control unit 226 and data supplied from the reconfigurable circuit 212. The sequencer control data selecting unit 228 supplies the second signal thus generated to the sequencer control data holding unit 222. In this illustrative example of the invention, the sequencer control data selecting unit 228 receives branch control data output from the reconfigurable circuit 212. The branch control data indicates the result of condition handling executed in processing an if statement or a for statement in a source program.

In this illustrative example of the invention, the configuration data holding unit 214 of the sequencer apparatus 220 manages configuration data supplied to the reconfigurable circuit 212 by referring to the result of operation in the reconfigurable circuit 212 or, more specifically, the result of condition handling therein. In this illustrative example of the invention, for efficient management of configuration data by the sequencer apparatus 220, the configuration data stored in the configuration data holding unit 214 and the sequencer control data stored in the sequencer control data holding unit 222 are generated in the following procedure.

Figure 32:
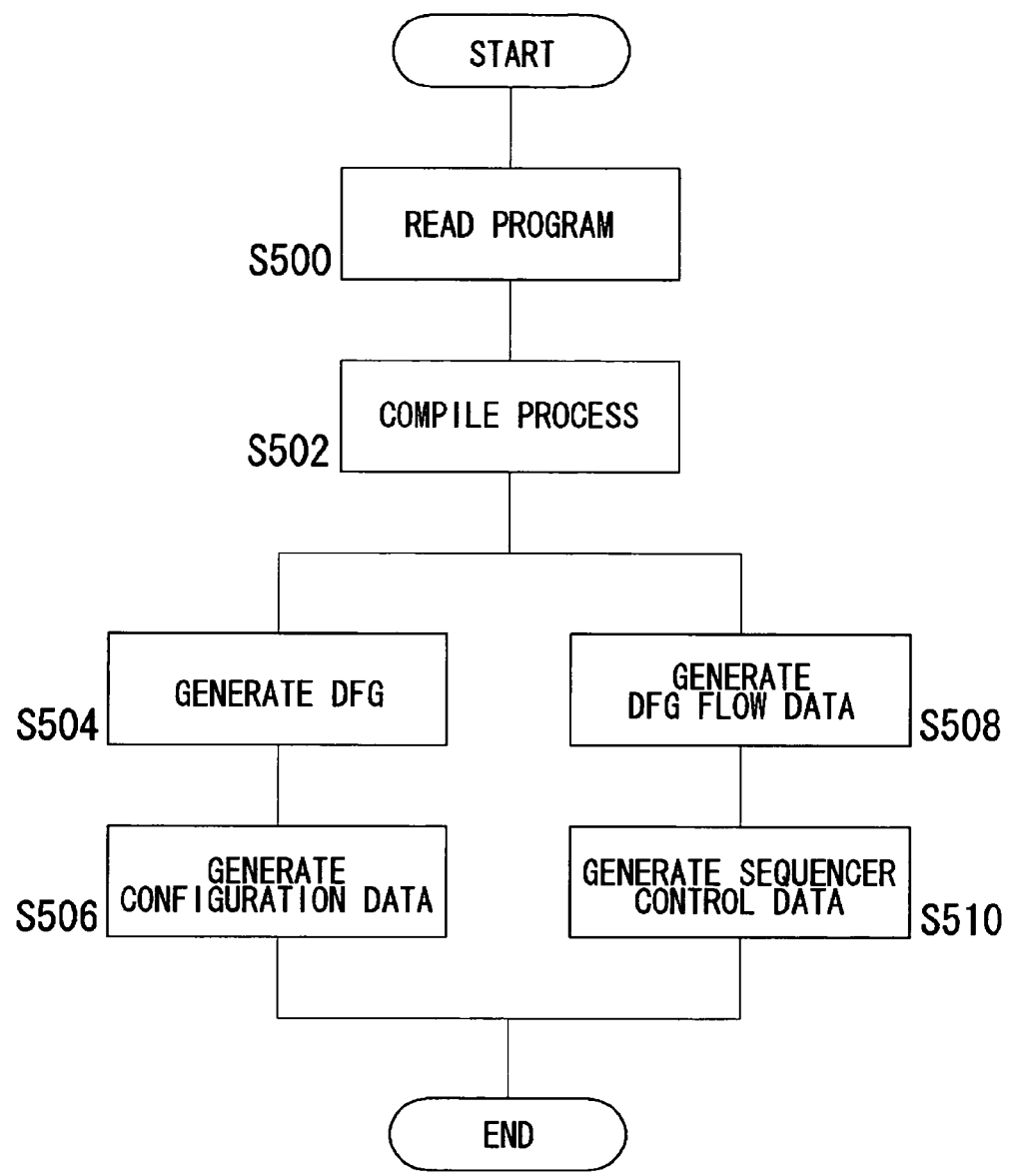
FIG. 32 shows the procedure of generating configuration data and sequencer control data.

FIG. 32 shows the procedure of generating configuration data and sequencer control data. The flow of generation is executed by a compiler apparatus (not shown).

The compiler apparatus reads a program to be implemented by the reconfigurable circuit 212 from a predetermined storage area (S500). The program represents a description of operations to be performed by the logic circuits and is a representation of a signal processing circuit or a signal processing algorithm in a high-level language such as C. The program is formed to include a conditional statement, a loop statement and the like. A conditional statement and a loop statement contain a process for condition handling for determining a transition target of operation. The next operation to be executed is determined by the result of condition handling.

For example, in a conditional statement represented as a set of if statement and else statement, the if statement is executed when the if condition is fulfilled and, when not, the else statement is executed. In the case of loop statement, a loop is exited and a new operation is executed when a process has been completed a predetermined number of times. If not, the repeat process is continued. The processing apparatus 200 according to this variation achieves efficient execution of operations, by using the result of condition handling that determines a branch target.

The compiler unit compiles the program thus read (S502) so as to convert it into data flow graphs (DFG) (S504) and generate flow data indicating the flow of processing the DFGs (S508). A DFG is a representation of dependency in execution between operations carried out in sequence in the circuit and is a graph structure representation of the flow of operations involving input variables and constants. DFG flow data is generated by dividing the entirety of DFGs into a plurality of DFG groups executing a predetermined sequence of processes and by combining the DFG groups so as to indicate the overall flow of the processes. A DFG group is formed by lumping together at least one DFG for which the order of execution is already determined. When there is one DFG in a DFG group, the order of execution of the only DFG is assumed to be already determined since that is the only DFG executed. When there are two or more DFGs, it is necessary that the order of execution of the two or more DFGs is already determined. The DFGs are converted into the corresponding configuration data (S506). The DFG flow data is converted into the corresponding sequencer control data (S510). The configuration data is for mapping the DFG into the reconfigurable circuit 212. The configuration data determines the functions of logic circuits in the reconfigurable circuit 212 and the connectivity between the logic circuits. The configuration data is stored in the configuration data holding unit 214 and the sequencer control data is stored in the sequencer control data holding unit 222.

Figure 33:
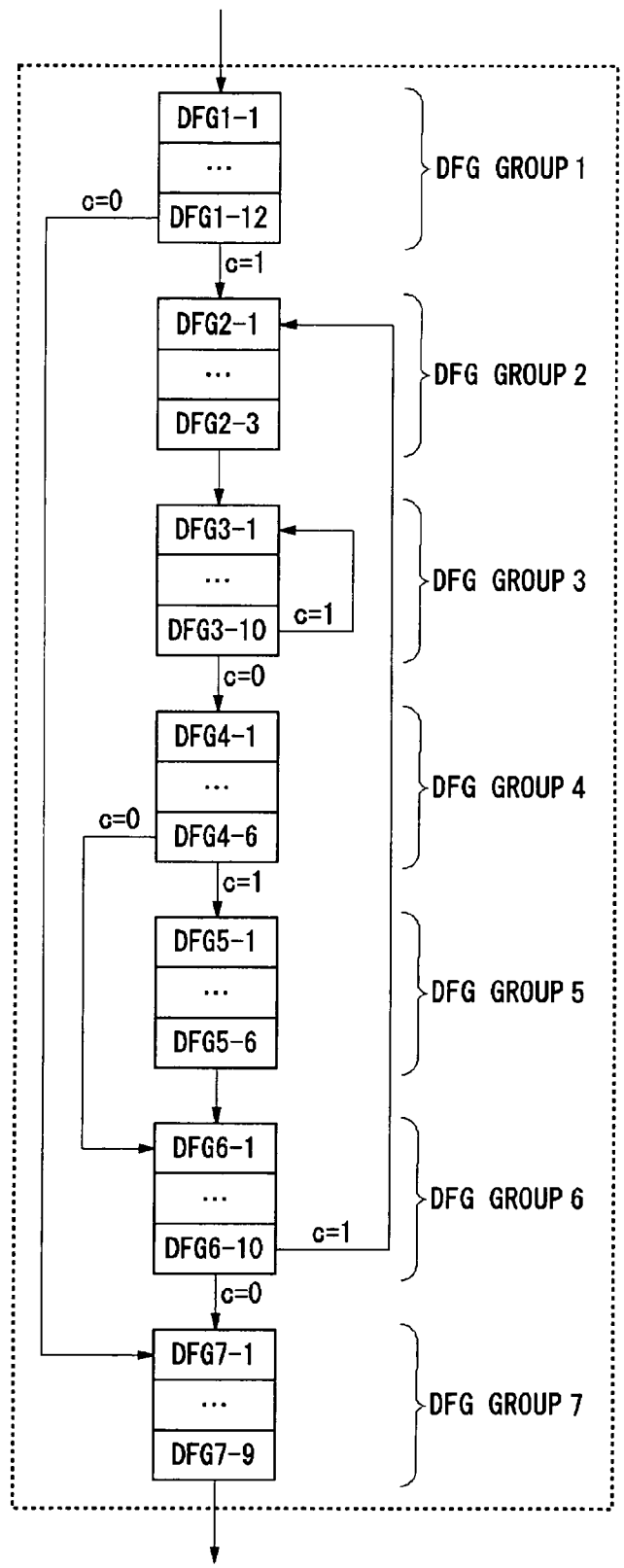
FIG. 33 shows an example of DFG flow data.

FIG. 33 shows an example of DFG flow data. A related-art DFG is generated such that the processes at both branch targets are executed when there is a branching process. In this illustrative example of the invention, consecutive DFGs for which the order of execution is already determined are identified as a group of DFGs. The relation between a plurality of DFG groups in terms of processing is represented as DFG flow data. That is, the operations in a given DFG group are self-contained in that they do not depend on any result of determination at a branch emanating from a different DFG group. The result of determination at a conditional branch in a DFG group is represented by branch control data c output from the reconfigurable circuit 212. The determination may be done in a DFG located in the middle of a DFG group or a DFG at the end of the group. FIG. 33 shows a flow for determining the next DFG in accordance with the value of the branch control data c. The branch control data c from the reconfigurable circuit 12 has a data format of a flag value. In the case of two-way branch, the data assumes a value of 1 or 0.

For example, referring to DFG group 3, when a loop process such as a for statement is executed, the branch control data c remains set to 1 before the loop termination condition is fulfilled. While the branch control data is set to 1, the operation in DFG group 3 is repeatedly executed. When the loop process has been executed a predetermined number of times so that the loop termination condition is fulfilled, the branch control data is set to 0 so that the operation in DFG group 4 is started. Referring to DFG group 1, when condition handling such as an if statement is executed to determine the branch target from the DFG group, the branch control data c is set to 1 when the if condition is fulfilled. When the if condition is not fulfilled or when the else-condition is fulfilled, the branch control data is set to 0. To put it in another way, the configuration data to be supplied to the reconfigurable circuit 212 is generated so as to allow the reconfigurable circuit 212 to generate the branch control data c when the circuit encounters a process (such as a for statement and an if statement) involving a conditional branch for determining a branch target from a DFG group. As already described, the configuration data is generated by a compile apparatus (not shown).

For example, DFG1-1 through DFG1-12 in DFG group 1 are DFGs executed in sequence without depending on the branch control data c. The DFG to be executed subsequent to DFG1-12 is either DFG2-1 or DFG7-1 depending on the value of the branch control data c, which is determined as a result of executing the operations in the reconfigurable circuit 212. Thus, in this illustrative example of the invention, DFG1-1 through DFG1-12, for which the order of execution is already determined without depending on the branch control data c, are organized as DFG group 1. The DFG executed at the end of a DFG group is placed at the end of the DFG group. In the case of DFG group 1, DFG1-12 is placed at the end of DFG group 1. Similarly, the rest of the DFGs are organized into DFG groups, ensuring that the DFG executed last is not placed in the middle. The illustrated DFG flow data is only an example. DFG group 2 and DFG group 3 may be organized as a single DFG group. In the illustrated example, a selfloop from DFG3-10 at the end to DFG3-1 at the head is formed. The selfloop would return to the middle of the DFG if DFG group 2 and DFG group 3 are joined. Even in this case, the DFG in which the last process occurs is the DFG at the end. A shift from a DFG in the middle from another DFG group never occurs.

Figure 34:
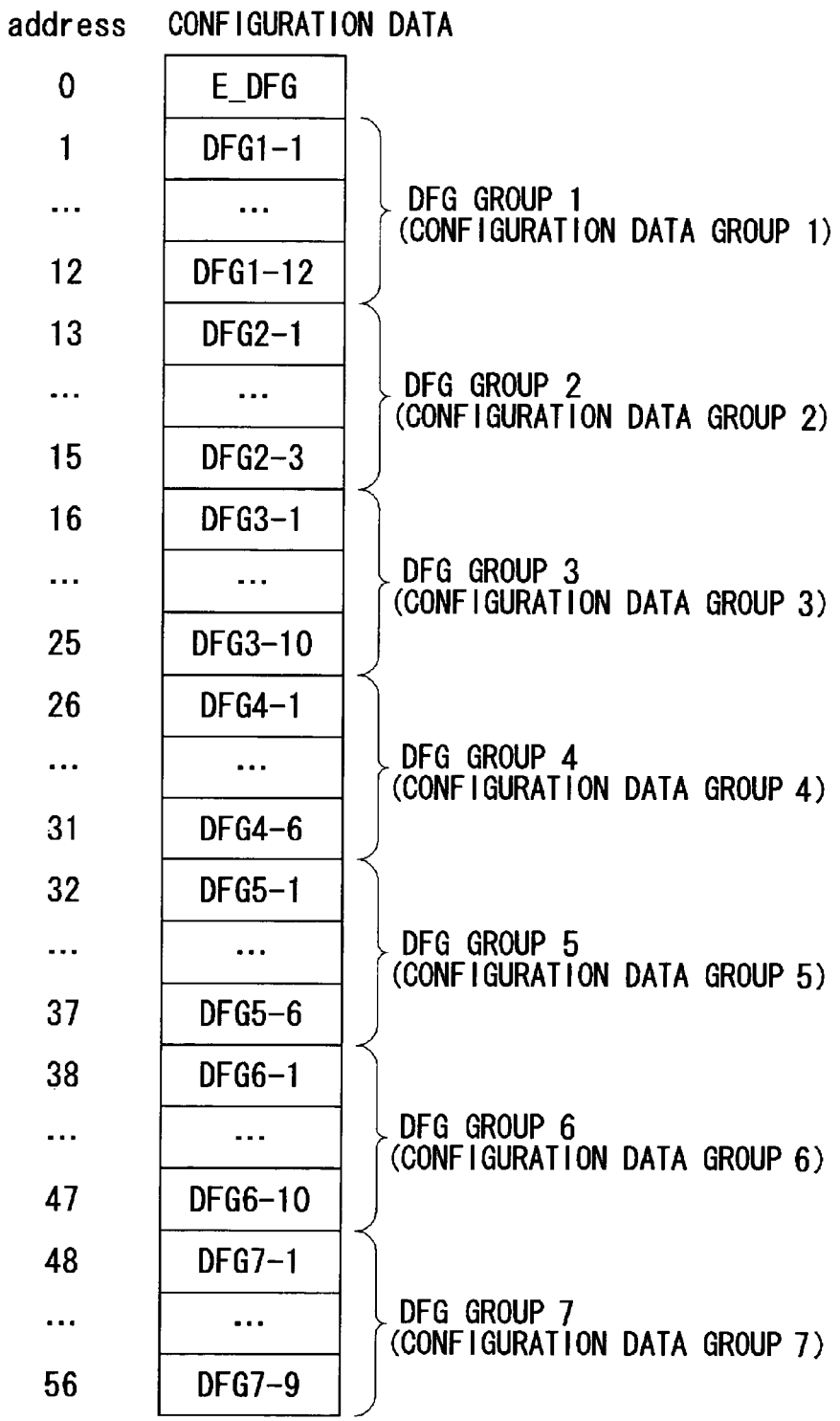
FIG. 34 shows an example of how the configuration data corresponding to the DFG flow data of FIG. 33 is stored in a configuration data holding unit.

FIG. 34 shows an example of how the configuration data corresponding to the DFG flow data of FIG. 33 is stored in the configuration data holding unit 214. It will be assumed here that a single DFG corresponds to a set of configuration data and that a set of configuration data is stored at an address in the configuration data holding unit 214. In the following description, DFG and configuration data may be referred to with no distinction. In this illustrative example of the invention, the configuration data is stored for each DFG group or, more specifically, stored as configuration data group, as shown in FIG. 34.

That is, the configuration data holding unit 214 organizes at least one set of configuration for which the order of supply to the reconfigurable circuit 212 is already determined, into a configuration data group. A plurality of sets of configuration data are held as a configuration data group. When there is one DFG in a DFG group, only that data is supplied to the reconfigurable circuit 212 from the group. For this reason, it is assumed that the order of supply to the reconfigurable circuit 212 is already determined. When there are two or more sets of configuration data, it is necessary that the order of supply of those sets to the reconfigurable circuit 212 is already determined. In this case, the configuration data holding unit 214 divides a plurality of sets of configuration data for forming a target circuit in the reconfigurable circuit 212 into seven configuration data groups. The configuration data holding unit 214 holds at least one set of configuration data in a configuration data group at consecutive addresses in a storage area in the order of supply to the reconfigurable circuit 212. That is, the arrangement of two or more DFGs in a DFG group matches the order of supply to the reconfigurable circuit 212.

With this, the read address in the configuration data holding unit 214 may only have to be incremented one by one in order to supply configuration data in a given DFG group to the reconfigurable circuit 212. Thus, generation of a read address (first selection signal) to be supplied from the configuration data selecting unit 224 to the configuration data holding unit 214 is simplified. As described, it is preferable that the configuration data in a DFG group be stored in the configuration data holding unit 214 in the order of execution. In contrast, assignment of addresses to different DFG groups may be appropriate. In addition to the configuration data for configuring the reconfigurable circuit 212, the configuration data holding unit 214 also holds configuration data (E_DFG) for time adjustment.

Figure 35:
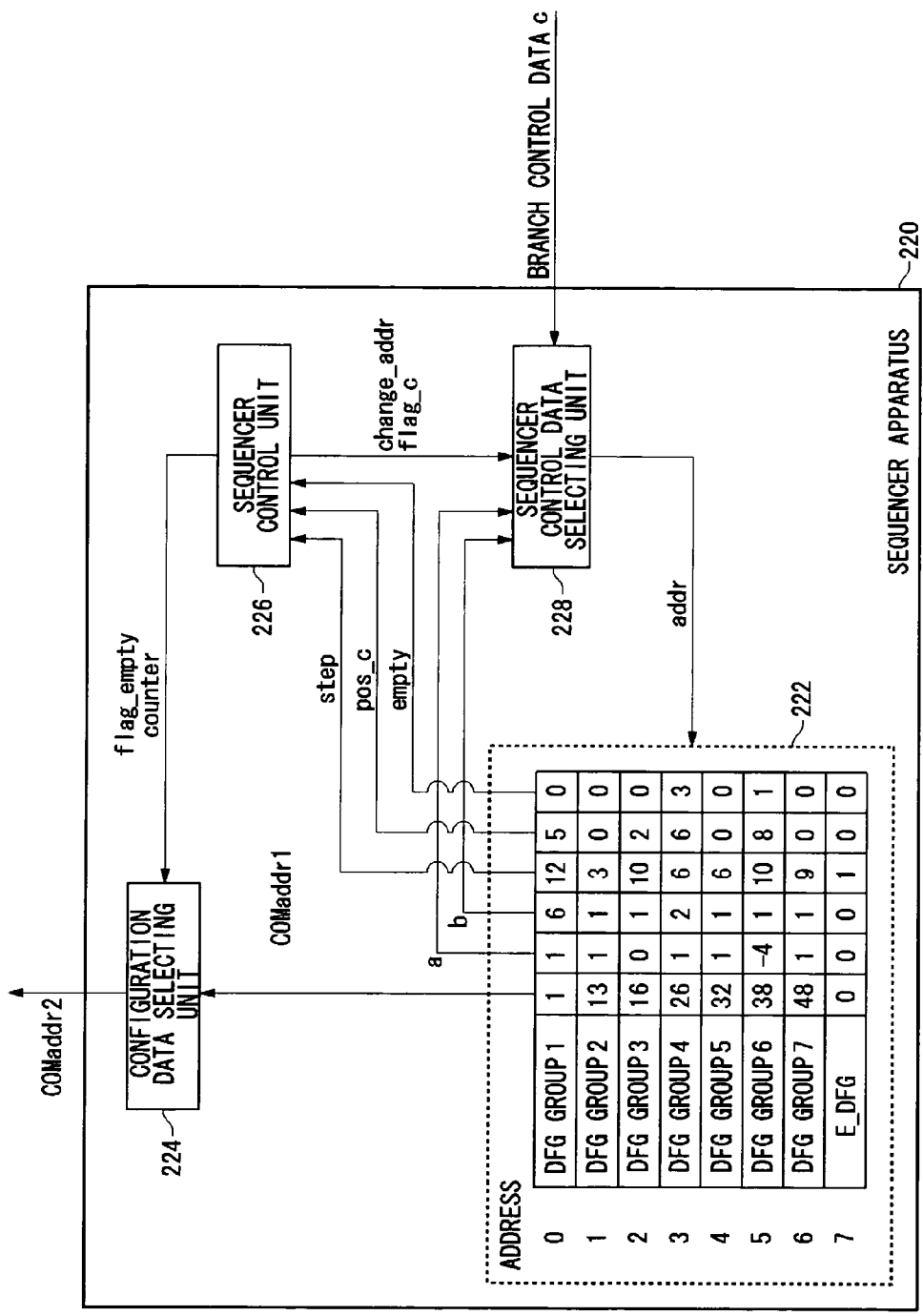
FIG. 35 shows a sequencer apparatus in detail.

FIG. 35 shows the sequencer apparatus 220 in detail. The sequencer control data holding unit 222 holds as sequencer control data: a RAM address (COMaddr1) of the DFG at the head of the DFG group in the configuration data holding unit 214; the number of travels to be made (a) to the next address to be read from by the sequencer control data holding unit 222 if the branch control data c is set to 1; the number of travels to be made (b) to the next address read to be from by the sequencer control data holding unit 222 if the branch control data c is set to 0; the number of DFGs in the DFG group (step); the position of the DFG (pos_c) in the DFG group outputting the branch control data c; and the number of E_DFGs (empty) to be added for time adjustment after all DFGs in the DFG group have been executed. In this illustrative example of the invention, these items of sequencer control data are lumped into a control data group which is linked with the corresponding DFG group (configuration data group). The control data group thus formed is stored at an address. The sequencer control data holding unit 222 of FIG. 35 stores at an address: the RAM address (COMaddr1), the number of travels (a), the number of travels (b), the number of DFGs in the DFG group (step), the position of the DFG outputting the branch control data c (pos_c) and the number of E_DFGs (empty).

The sequencer control data is generated based on the DFG flow data shown in FIG. 33. In the example of FIG. 35, the sequencer control data of DFG group 1 is stored at address 0 in the sequencer control data holding unit 222. Similarly, the sequencer control data group of DFG group 2 is stored at address 1, the sequencer control data group of DFG group 3 is stored at address 2, the sequencer control data group of DFG group 4 is stored at address 3, the sequencer control data group of DFG group 5 is stored at address 4, the sequencer control data group of DFG group 6 is stored at address 5 and the sequencer control data group of DFG group 7 is stored at address 6. The sequencer control data group may not necessarily be stored at respective addresses in the order of DFG numbers in the DFG flow data and may be stored randomly.

The sequencer control data group for E_DFG is stored at address 7 in the sequencer control data holding unit 222. The configuration data of E_DFG does not affect the result of operation in a target circuit formed in the reconfigurable circuit 212 and is used for time adjustment after all DFG groups have been executed. For example, assuming that the clock rate in the processing apparatus 200 is 100 times an external clock rate, the number of DFGs that can be executed in 1 external clock in the reconfigurable circuit 212 is 100. The external clock rate affects the timing of input and output occurring between an external apparatus and the reconfigurable circuit 212. If the number of DFGs executed (the number of sets of configuration data) is predetermined, the timing for input and output to and from an external apparatus can be determined. Since the operations in this illustrative example of the invention involve a branching process, the total number of DFGs executed varies depending on the determination at the branches. Referring to FIG. 33, the process of DFG group 2 or that of DFG group 7 is executed depending on the result of conditional determination made after the process of DFG group 1 is completed. As a result, the number of DFGs executed varies. Accordingly, for timing adjustment in relation to the external apparatus, the configuration data of E_DFG is executed 100 times or fewer, after DFG7-9, the last DFG, is executed, without changing the operation result being held. In this way, processing time is adjusted.

The sequencer control data COMaddr1 indicates the address in the configuration data holding unit 214 for the DFG at the head of the DFG group. In the example shown in FIG. 35, the sequencer control data COMaddr1 designates the address of the DFG at the head of the DFG group. Alternatively, in a case where a selfloop in the DFG group returns to a DFG in the middle of the DFG group, the address of the DFG in the middle may be designated in addition to the sequencer control data COMaddr1. The sequencer control data COMaddr1 may be referred to as group selection control data in that it selects a configuration data group. Since the DFG at the head of DFG group 1 is DFG1-1, COMaddr1 at address 0 in the sequencer control data holding unit 222 is 1 (see FIG. 34). This is true of other DFGs as well. Referring to FIG. 34, COMaddr1 at address 1 in the sequencer control data holding unit 222 is 13, COMaddr1 at address 2 is 16, COMaddr1 at address 3 is 26, COMaddr1 at address 4 is 32, COMaddr1 at address 5 is 38 and COMaddr1 at address 6 is 48. The sequencer control data group corresponding to E_DFG is stored at address 7. COMaddr1 is 0.

The sequencer control data a and b indicate the number of travels to be made to the address in the sequencer control data holding unit 222 to read from next. The sequencer control data a and b are set to a relative value of the address of the next DFG group in the sequencer control data holding unit 222 with respect to the current address. The sequencer control data a and b are selectively read by the sequencer control data selecting unit 228 in accordance with the branch control data c. Referring to FIG. 33, if the branch control data c is set to 1 after the process of DFG group is completed, the next process to be executed is DFG group 2. A relative value between address 0 of DFG group 1 and address 1 of DFG group 2 is 1. Accordingly, the sequencer control data a at address 0 in the sequencer control data holding unit 222 is set to 1. If the branch control data c is set to 0, the next process to be executed is DFG group 7. Since a relative value between address 0 of DFG group 1 and address 6 of DFG group 7 is 6, the sequencer control data b is set to 6. This is true of other DFGs as well. For example, in DFG group 3, the next process to be executed is DFG group 3 if c=1. Therefore, the sequencer control data a is set to 0. If c=0, the next process to be executed is DFG group 4 so that the sequencer control data b is set to 1. In DFG group 6, the next process to be executed is DFG group 2 if c=1, meaning that feedback in the DFG flow data occurs. Therefore, the sequencer control data a is set to −4. The sequencer control data a and b may be addresses in the sequencer control data holding unit 222 to read from next.

The sequencer control data step indicates the number of DFGs in the DFG group. DFG group 1 contains 12 DFGs so that step is set to 12. This is true of other DFGs as well.

The sequencer control data pos_c indicates the position of the DFG in the DFG group outputting the branch control data c. For example, assuming that the branch control data c is generated in the reconfigurable circuit 212 into which the configuration data of DFG1-5 is mapped, the sequencer control data pos_c is set to 5. This is true of other DFGs as well.

The sequencer control data empty indicates the number of E_DFGs added for time adjustment after all DFGs in the current DFG group have been executed. After the value of the branch control data c is output from the reconfigurable circuit 212, the sequencer control data selecting unit 228 designates an address in the sequencer control data holding unit 222 by referring to the branch control data c and read target sequencer control data accordingly. The configuration data selecting unit 224 then designates an address in the configuration data holding unit 214 so that the target configuration data is supplied to the reconfigurable circuit 212. The supply the target configuration data to the reconfigurable circuit 212 may be preceded the supply of the configuration data in the current configuration data group entirely to the reconfigurable circuit 212. When this happens, the configuration data holding unit 214 supplies configuration data of a desired number of E_DFGs to the reconfigurable circuit 212 for time adjustment.

For example, in DFG group 4, the sequencer control data pos_c indicates that the last DFG in DFG group 4 generates the branch control data c for output. A certain time is required before the sequencer control data selecting unit 228 generates a read address in the sequencer control data holding unit 222 by referring to the branch control data c, the configuration data selecting unit 224 selects configuration data by referring to the sequencer control data thus read, and the configuration data holding unit 214 supplies the configuration data to the reconfigurable circuit 212. In the hardware structure of FIG. 35, processing time for three DFGs is required. If configuration data fails to be supplied to the reconfigurable circuit 212, the operation result may be overwritten. By allowing the configuration data of E_DFG that does not affect the operation result to be executed by the reconfigurable circuit 212 until the configuration data of the next DFG group is supplied to the reconfigurable circuit 212, the possibility of the operation result being overwritten is avoided. Accordingly, the sequencer control data empty in DFG group 4 is set to 3.

The sequencer control data pos_c in DFG group 6 indicates that, the 8th DFG, of a total of 10 DFGs in DFG group 6, generates the branch control data c, meaning that a time interval for two DFGs elapses until the last DFG is executed. It is therefore necessary to insert one E_DFG (3−2=1). Accordingly, the sequencer control data empty in DFG group 6 is set to 1.

As will be understood from the above description, when the number of DFGs subsequent to the DFG outputting the branch control data c is 3 or greater in a given DFG group, the sequencer control data empty is set to 0.

The sequencer control unit 226 is provided with a counter for counting the position of the current DFG in the DFG group. The counter increments the count by one by one in synchronization with the timing of output of the configuration data from the configuration data holding unit 214. The count is used in the configuration data selecting unit 224 as intra-group selection control data for selecting the configuration data in a configuration data group.

When the counter count is equal to a total of the sequencer control data step and empty read from the sequencer control data holding unit 222, the counter count is reset to an initial value of 1. For example, when the sequencer control data read from the sequencer control data holding unit 222 is switched from DFG group 3 to DFG group 4, the counter count is set to 1. When the counter is incremented 8 times so that counter count reaches 9 (step+empty=6+3), the subsequent clock resets the counter count to an initial value of 1. When the counter count reaches the initial value of 1, the sequencer control data holding unit 222 reads the sequencer control data of DFG group 5 or DFG group 6 by referring to the selection signal addr supplied from the sequencer control data selecting unit 228. The sequencer control data holding unit 222 then supplies the read data to the configuration data selecting unit 224, the sequencer control unit 226 and the sequencer control data selecting unit 228.

The sequencer control unit 226 generates a signal flag_empty indicating the result of determination as to whether the address of E_DFG should be generated in the configuration data selecting unit 224. If the counter count>step, flag_empty is set to 1. Otherwise, flag_empty is set to 0. flag_empty indicates the result of determination as to whether E_DFG should be inserted for time adjustment when all DFGs in a DFG group have been executed. When flag_empty=1, the configuration data selecting unit 224 generates the address of E_DFG. For example, step=6 in DFG group 4. The counter count is increased by increment from 1 to 9. When the counter count is 7, 8 or 9, flag_empty is set to 1. Otherwise, flag_empty is set to 0.

The configuration data selecting unit 224 generates a read address COMaddr2 of the configuration data read from the configuration data holding unit 214. If flag_empty is set to 1, COMaddr2 is set to be the address of E_DFG (EMPTYDFG_ADDR). If flag_empty is set to 0, COMaddr2 is set to (COMaddr1+counter count−1). As described, when flag_empty is set to 0, the configuration data selecting unit 224 generates a read COMaddr2 by referring to COMaddr1 (group selection control data) and the counter count (intra-group selection control data). EMPTYDFG_ADDR is set to 0 (see FIG. 34). The configuration data selecting unit 224 receives the counter count from the sequencer control unit 226 so that (COMaddr1+counter count−1) is incremented one by one as the counter count being incremented concurrently. FIG. 36 shows an algorithm in the configuration data selecting unit 224 for generating a read address.

As described with reference to FIG. 34, the configuration data holding unit 214 stores DFGs in a given DFG group at consecutive addresses in accordance with the order of execution. Therefore, the configuration selecting unit 224 is capable of supplying the addresses of the configuration data of the DFGs in the DFG group to the reconfigurable circuit 212 by incrementing from the address (COMaddr1) of the first configuration data set according to a predetermined timing schedule. For example, in DFG group 4, the counter count is incremented until it is equal to 9. When the counter count=7, 8, or 9, flag_empty is set to 1. Since COMaddr1=26, the configuration data selecting unit 224 sets COMadd2 to 26, 27, 28, 29, 30, 31, 0, 0 and 0 in the stated order for supply to the configuration data holding unit 214. By reading the configuration data from the configuration data holding unit 214 in this order, DFG4-1, . . . , DFG4-6 are generated in the reconfigurable circuit 212 in the first 6 clocks. E_DFGs are generated in the last 3 clocks.

The sequencer control unit 226 generates flag_c indicating the timing of supply of the branch control data c from the reconfigurable circuit 212 to the sequencer control data selecting unit 228. The sequencer control unit 226 also generates change_addr indicating the timing of change in the sequencer control data selecting unit 228 to the address of the next DFG group in the sequencer control data holding unit 222. The sequence control unit 226 supplies flag_c and change_addr to the sequencer control data selecting unit 228. flag_c is generated by allowing for a delay time (DELAYTIME1) that elapses since the address of the configuration data that generates the branch control data c is generated by the configuration data selecting unit 224 until the branch control data c is supplied to the sequencer control data selecting unit 228. When the counter count is set at (pos_c+DELAYTIME1), flag_c is changed from 0 to 1. change_addr is generated by allowing for a delay time (DELAYTIME2) required for the sequencer control data selecting unit 228 to supply a read address to the sequencer control data holding unit 222. When the counter count is (step+empty−DELAYTIME2), change_addr is changed from 0 to 1. For example, assuming that DELAYTIME1=2 and DELAYTIME2=1, flag_c is set to 1 when the counter count=5+2=7 since pos_c=5 in DFG group 1. Since step=12 and empty=0, change_addr is set to 1 when the counter count=12+0−1=11. FIG. 37 shows an algorithm for the operation of the sequencer control unit 226.

The sequencer control data selecting unit 228 generates a read address addr for reading the sequencer control data from the sequencer control data holding unit 222. The sequencer control data selecting unit 228 also holds set_c indicating the value of the sequencer control data a or b in the sequencer control data holding unit 222. The sequencer control data selecting unit 228 also holds a current read address addr in the sequencer control data holding unit 222. When flag_c indicates the timing of the supply of the branch control data c from the reconfigurable circuit 212 (flag_c=1), the sequencer control data selecting unit 228 causes set_c to hold the sequencer control data b if the branch control data c is set to 0. If the branch control data c is set to 1, set_c is caused to hold the sequencer control data a. When change_addr indicates the timing of the change of the read address addr (change_addr=1), the sequencer control data selecting unit 228 adds set_c to addr if pos_c is set to a value other than 0. If pos_c is set to 0, it means that the next DFG group to read is uniquely identified without depending on the branch control data c. In this case, the sequencer control data selecting unit 228 adds the sequence control data a to addr. Referring to FIGS. 33 and 35, pos_c is set to 0 in DFG group 2, DFG group 5 and the like. In this case, the branch control data is not supplied from within the group and the next DFG group to be executed is predetermined.

When change_addr is set to 0, it means that the DFG group is not changed. The sequencer control data selecting unit 228 holds the addr value as it is. By using addr thus generated as a read address in the sequencer control data holding unit 222, the target sequencer control data can be read. For example, in DFG group 1, when the counter count=7, flag_c is set to 1. If the branch control data c is set to 0 in this case, set_c=b=6. When the counter count=11, change_addr is set to 1. In this case, the current addr is set to 0 and pos_c is set to 5 (not equal to 0). Therefore, new addr (=6) is set by adding set_c (=6) to addr. Accordingly, the next sequencer control data to be read from the sequencer control data holding unit 222 is that of DFG group 7 stored at address 6 in the sequencer control data holding unit 222. When change_addr=0, addr remains unchanged so that the same sequencer control data, i.e., the data of DFG group 1, is read. FIG. 38 shows an algorithm for operation of the sequencer control data selecting unit 228.

Thus, when the DFG located toward the head of the DFG group generates the branch control data c, as in the case of DFG group 1 above, it is possible to generate a signal for determining the next DFG group and hold the signal as set_c, while the configuration data of the rest of the DFGs is being supplied to the reconfigurable circuit 212. Accordingly, delay due to the selection made in changing the DFG group does not occur. Therefore, the DFGs can be supplied without any interruption not only within a DFG group but also between DFG groups. Processing performance is improved and power consumption is reduced accordingly. By allowing the sequencer control data holding unit 222 to hold the control data in units of DFG groups instead of individual DFGs, the number of sets of sequence control data is reduced. Accordingly, the memory capacity of the sequencer control data holding unit 222 can be reduced and circuit scale is reduced accordingly.

A description will now be given of advantages obtained by providing the sequencer apparatus 220 as described.

For example, when DFG group 5 or DFG group 6 is executed after a conditional branch represented by an if statement, the sequencer apparatus 220 is capable of executing one of DFG group 5 or DFG group 6 by receiving the branch control data c indicating the direction to be pursued after the conditional branch. If the sequencer apparatus 220 is absent as in a related-art processing apparatus, both DFG group 5 and DFG group 6 are executed so that one of the results is selected depending on the result of determination at the conditional branch represented by the if statement, thereby causing processing time to be extended. Since the processing apparatus 200 is provided with the sequencer apparatus 220, processing speed is improved and power consumption is reduced. Even in a case where processing volume of if statement and that of else statement differ significantly, a DFG group is generated in which are included DFGs of substantially the same sizes and sufficient in number to handle the processing volume. The DFGs are then sequentially executed. Accordingly, the number of non-operating circuit parts can be reduced and processing performance is improved.

Further, in a case where DFG group 3 is repeatedly called from a loop process represented by a for statement, the processing apparatus 200 of the illustrative example of the invention provided with the sequencer apparatus 220 either continues to execute the loop process involving DFG group 3 or exit the loop so as to execute DFG group 4, in response to the branch control data c indicating the direction to be pursued after the conditional branch. Therefore, the processing apparatus 200 is capable of executing a loop process by providing, in the configuration data holding unit 214, the configuration data of DFG group 3 for one loop process only, and by calling the same as many times as required by the loop process. If the sequencer apparatus 220 is absent, it is necessary to provide the entire configuration data commensurate with the loop count in the configuration data holding unit 214 and to sequentially process the data, resulting in a large volume of configuration data. By providing the sequencer apparatus 220 in the processing apparatus 200 according to the illustrative example of the invention, the capacity of the configuration data holding unit 214 is reduced and circuit scale is reduced. In the case of loop process with an indefinite loop count wherein the loop count is determined by an operation result within the loop, it is enormously difficult to determine the order of execution in advance without the sequencer apparatus 220. With the sequencer apparatus 220, a determination as to whether to continue the loop process can be made on a real time basis, by referring to the branch control data c so that the loop process with an infinite loop count can be easily executed.

Finally, a comparison will be made in respect of scale between the circuit provided with the sequencer apparatus 220 and the circuit without the same. In this case, the use of DFGs in an IDCT processing unit adapted for MPEG-4 is assumed. It will also be assumed that each of the configuration data holding unit 214 and the sequencer control data holding unit 222 is formed as one-port RAM, where 1 bit=1.5 gate. In the circuit not provided with the sequencer apparatus 220, the gate count of the configuration data holding unit 214 is 285000. In contrast, in the circuit provided with the sequencer apparatus 220, the gate count of the sequencer apparatus 220 is 5000, the gate count of the configuration data holding unit 214 is 67000 and the gate count of the sequencer control data holding unit 222 is 300, requiring a total of 72000 gates. Accordingly, a reduction by a factor of 0.25 in circuit scale is achieved from the circuit not provided with the sequencer apparatus 220 to the circuit provided with the same. Reduction in circuit scale is very important especially when the processing apparatus 200 is formed as a portable apparatus. Even if the apparatus is not formed as a portable apparatus, reduction in circuit scale leads to reduction in power consumption, realizing a highly useful processing apparatus 200.

Described above is a variation of the processing apparatus. In this variation, it is assumed that the branch control data c is generated as an output from the reconfigurable circuit 212. Alternatively, the branch control data c may be determined by the state of an external apparatus. In this case, the branch control data c is supplied from an external source.

While the preferred embodiments of the present invention have been described using specific terms, such description is for illustrative purposes only, and it is to be understood that changes and variations may be made without departing from the spirit or scope of the appended claims.

The present invention, represented not by the description given but by the scope of the appended claims, is intended to encompass modifications that are within the meaning and scope equivalent to that covered by the appended claims.

What is claimed is:

1. An apparatus having data flow graph (DFG) processor, which processes a DFG necessary for configuration of a reconfigurable circuit capable of changing functions, comprising:

a central processing unit;

a dividing unit which divides a program describing target operations into two or more subprograms;

a DFG generating unit which generates, using the central processing unit, a plurality of DFGs corresponding to the two or more subprograms in accordance with a description in the program, the DFGs representing dependency in execution between the target operations of the program carried out in sequence, wherein the generating unit generates, when a branching process is detected in the program, a first DFG of the plurality of DFGs indicating a process before the branching process, and a second DFG of the plurality of DFGs indicating a process after the branching process, and at least either one of the first DFG or the second DFG includes a process for determining a destination of the branching process;

a flow data generating unit which generates flow data indicating the order of execution of the DFGs based on the generation by the DFG generating unit; and a configuration data generating unit which converts the DFGs into corresponding configuration data for mapping the DFGs into the reconfigurable circuit and defining the functions in the reconfigurable circuit.

* * * * *